United States Patent [19]
Jacopi et al.

[11] Patent Number: 5,701,456
[45] Date of Patent: Dec. 23, 1997

[54] SYSTEM AND METHOD FOR INTERACTIVELY FORMULATING DATABASE QUERIES USING GRAPHICAL REPRESENTATIONS

[75] Inventors: Tom William Jacopi; Brian Gerrit Payton; Howard Alexander Siwek, all of San Jose, Calif.

[73] Assignee: International Business Machines Corporation, Armonk, N.Y.

[21] Appl. No.: 520,903

[22] Filed: Aug. 30, 1995

Related U.S. Application Data

[63] Continuation of Ser. No. 32,914, Mar. 17, 1993, abandoned.
[51] Int. Cl.$^6$ .................................................. G06F 17/30
[52] U.S. Cl. .................................... 395/604; 395/349
[58] Field of Search ........................... 395/608, 610, 395/614, 615, 603, 604, 602, 348, 349

[56] References Cited

U.S. PATENT DOCUMENTS

| | | | |
|---|---|---|---|
| 4,506,326 | 3/1985 | Shaw | 395/604 |
| 5,175,814 | 12/1992 | Anick | 395/348 |
| 5,201,046 | 4/1993 | Goldberg | 395/611 |
| 5,287,493 | 2/1994 | Jacopi | 395/604 |
| 5,355,474 | 10/1994 | Thuraisngham | 395/607 |
| 5,421,008 | 5/1995 | Banning et al. | 395/604 |
| 5,428,737 | 6/1995 | Li et al. | 395/604 |
| 5,428,776 | 6/1995 | Rothfield | 395/604 |

FOREIGN PATENT DOCUMENTS

| | | |
|---|---|---|
| 0-491-517 | 6/1992 | European Pat. Off. . |
| 92/16903 | 10/1992 | WIPO . |

OTHER PUBLICATIONS

"Data Partner 1.0 Simplified DB Query Routies", article in *PC Week*, Sep. 14, 1992, pp. 55, 58.

Burns et al., "Graqula: A Graphical Query Language for Entity–Relationship or Relational Databases", IBM Research Journal, RC 16877, Mar. 14, 1991, *Computer Science*, 34 pp.

IBM TDB –K. R. Banning, et al., Dynamic, Interactive Show SQL Window, Sep. 1992, vol. 35, No. 4A, pp. 101–102.

D. Young, et al., "A Graphical Filter/Flow Representation of Boolean Queries: A Prototype Implementation and Evaluation", Jul. 1993, vol. 44, #6.

P. Anick et al., "A Direct Manipulation Interface for Boolean Information Retrieval via Natural Language Query," *Proc. ACM SIGIR '90*, pp. 135–150, 1990.

*Primary Examiner*—Thomas G. Black
*Assistant Examiner*—Jack M. Choules
*Attorney, Agent, or Firm*—Merchant, Gould, Smith, Edell, Welter & Schmidt

[57] ABSTRACT

In a computerized database system, a query is formulated to retrieve data from the database by interactively identifying at least one table containing query data, and at least one column and at least one row in the identified table containing the query data. The rows are interactively identified using a condition statement. The condition statement is interactively formulated using at least one displayed flowline. Input is received from the user specifying a position on the flowline for insertion of a predicate and the predicate. The flowline is displayed with the predicate inserted in the specified location. The predicates are displayed on the flowline in between nodes. Predicates on the same flowline are combined through a logical AND operation. Predicates on different flowlines between the same nodes are combined through a logical OR operation. The flowline is converted to a corresponding Boolean algebra statement and displayed. Input from the user adding a predicate is received in the Boolean statement and is converted to a corresponding updated graphical flow representation.

37 Claims, 16 Drawing Sheets

FIG. 13

```
do until No_Changes = true
 No_Changes = true do for each node in Node Array
   if In_node > 1 then ~ 197                            ┌ 180
     if two arcs in In_List_node have same from node
       Combine condition text between two arcs with '(text1)OR(text2)'
181~  Place combined text into first arc
       Delete all references to second arc
       No_Changes = false
     endif
   else                                                 ┌ 182
     in In_node = 1 AND Out_node = 1 then
       Combine condition text between two arcs with '(text1)AND(text2)'
183~  Place combined text into first arc
       Delete all references to second arc
       No_Changes = false
     endif
   endif
 enddo
enddo
```

Fig.17

```
Start_Node = starting node of graph (IN=0 and OUT>0)
End_Node = ending node of graph (IN>0 and OUT=0)
Boolean_Text =
Current_Place = 1
push Start_Node and Current_Place onto stack ~205 do while (stack not empty)
  Current_Node = pop top node off of stack
  Current_Place = pop top place off of stack ~207
  Arc_Count = 0 do for each arc
    if From_Node_Arc = Current_Node then
      Arc_Count = Arc_Count +1

If Arc_Count -= 1 then
        Current_Place = add_text Current_Place, ()R' ) ~209
      endif if 'To_Node'_Arc -= End_Node then
        Current_Place = add_text( Current_Place, '(' ) ~210

Current_Place = add_text( Current_Place.Condition_Arc) ~211 if 'To_Node'_Arc -= End_Node then
        Current_Place = add_text( Current_Place, 'AND')
        Current_Place = add_text( Current_Place, '(')

Push 'To-Node'_Arc and Current_Place onto stack ~212
        Current_Place = add_text( Current_Place. ')')
        Current_Place = add_text( Current_Place. ')')
      endif
    endif
  enddo
enddo procedure add_text( Location, Text)
  /*add_text inserts the string 'Text' into Boolean_Text at Location,*/
  /*returning a new location just AFTER the inserted text.          */

Boolean_text = INSERT(Boolean_text, Text, Location)
  New_Location = Location just AFTER the inserted text return New_Location
```

| Nodes | Arcs | | | | Stack |
|---|---|---|---|---|---|
| Node | # | From Node | To Node | Condition | Node.Place |
| A | 1 | A | C | P1 | A.1 |
| B | 2 | C | D | P2 | |
| C | 3 | A | D | P3 | |
| D | 4 | C | B | P4 | |
|   | 5 | D | B | P5 | |

```
Boolean_Text   = ' '
Current_Node   = A
Current_Place  = 1
Start_Node     = A
End_Node       = B
```

Fig.20

Build parse tree for Boolean condition ⌒ 230

Next_Node_Id = 0
Parse_Tree_Node = Root of parse tree

\* Set up first node of tree for processing ⌒ 234
Parse_TreeNode$_{from\_node}$ = Next_Node_ID
Next_Node = Next_Node_Id + 1
Parse_Tree_Node$_{to\_node}$ = Next_Node_Id DO for each Parse_Tree_Node BY preorder traversal /\* All simple conditions (X>1) have no children    \*/
If Parse_Tree_Node has no children THEN
   Create graph arc where
     "To Node" is Parse_Node$_{to\_node}$
     "From Node" is Parse_Tree_Node$_{from\_node}$   ⌒ 6
     "Condition" is Parse_Tree_Node$_{condition}$ else
    if Parse_Tree_Node$_{connector}$ = OR then
      Child = Parse_Tree_Node$_{left\_child}$
      Child$_{from\_node}$ = Parse_Tree_Node$_{from\_node}$
      Child$_{to\_node}$ = Parse_Tree_Node$_{to\_node}$
      Child = Parse_Tree_Node$_{right\_child}$   ⌒ 238
      Child$_{from\_node}$ = Parse_Tree_Node$_{from\_node}$
      Child$_{to\_node}$ = Parse_Tree_Node$_{to\_node}$ else  /\* AND connector \*/
      Next_Node = Next_Node_Id + 1
      Child = Parse_Tree_Node$_{left\_child}$
      Child$_{from\_node}$ = Parse_Tree_Node$_{from\_node}$
      Child$_{to\_node}$ = Next_Node_ID   ⌒ 240
      Child = Parse_Tree_Node$_{right\_child}$
      Child$_{to\_node}$ = Next_Node_ID
      Child$_{to\_node}$ = Parse_Tree_Node$_{to\_node}$
   endif
  endif
enddo A<1 or (B<2 and C<3)

New_Node_Id = 3

|  | #condition | From Node | To Node |
|---|---|---|---|
| 251 ~ | 1 OR | 1 | 2 |
| 252 ~ | 2 A<1 | — | — |
| 253 ~ | 3 AND | — | — |
| 254 ~ | 4 B<2 | — | — |
| 255 ~ | 5 C<3 |  |  |

Arc list  266

| condition | From Node | To Node |  |
|---|---|---|---|
| A<1 | 1 | 2 | ~260 |
| B<2 | 1 | 3 | ~262 |
| C<3 | 2 | 3 | ~264 |

Final arc list for: A<1 or (B<2 and C<3)

SYSTEM AND METHOD FOR INTERACTIVELY FORMULATING DATABASE QUERIES USING GRAPHICAL REPRESENTATIONS

This application is a continuation of application Ser. No. 08/032,914, filed Mar. 17, 1993, now abandoned.

FIELD OF THE INVENTION

The present invention relates to computerized relational database informational retrieval systems, and more particularly relates to user interfaces for retrieving data from relational databases.

BACKGROUND OF THE INVENTION

Computerized Database Management Systems (DBMSs) enable enterprises to efficiently manage and access data. DBMSs store data electronically in data storage devices such as direct access storage devices (DASD). Computer programs run by a computer system provide access to the database. The database user controls the computer processor and memory from a terminal using interaction devices such as a keyboard or a mouse.

The DBMS provides access to the database by logically controlling the storage and retrieval of the data. A relational DBMS logically stores the data organized into a plurality of tables consisting of a plurality of rows and columns. Columns contain data of the same kind. Rows contain different kinds of data about a single thing. The tables and columns are assigned names through which a user can identify tables, columns and rows for data retrieval.

Data is retrievable from a relational database by a variety of methods. A computer program can extract information from the database without any human user intervention. Additionally, database users can interact with the database using a query system program serving as an access program to the database system.

A common interface to a relational database is the Structured Query Language (SQL). SQL queries identify the database, the columns and rows for retrieval of the data. The columns are selected in the SQL SELECT statement. The rows are determined by the condition statements in the SQL SELECT statement WHERE clause. The condition statement identifies rows as a function of at least one column of at least one table. For example, an enterprise may have an employee database from which reports are generated from time to time, such as a report on the names of employees in a sales department who have been with the company for more than 10 years. An SQL statement would be used to retrieve the data from the employee database by retrieving all the employee names from a name column of a database table where the corresponding column in the same row for employee department has the value "sales" and the corresponding column in the same row for employment years has a value greater than 10. The SQL statement would look like:

1 SELECT EMP.NAME
2 FROM EMP_TABLE
1 WHERE EMP.DEPT="sales" and EMP.YEARS>10.

The foregoing SQL statement is a simplistic example of a query statement that is used to retrieve data stored in a computerized database system. The queries can be quite complex involving many tables and many conditions placed on the row values in order to identify the rows to be retrieved.

There are a number of commercially available database query user interface programs which help the database user interactively construct queries for data retrieval. One such database interface program is the QMF product from the IBM Corporation. One feature of the QMF product which assists users in writing SQL queries is called Prompted Query. In Prompted Query, users can write conditions to restrict the answer set (rows of data) returned by the DBMS. These conditions are placed in the SQL WHERE clause. The conditions are comprised of predicates which are connected by AND and OR operators. Predicates are statements having variables that are substituted having a true or false value. For example, "EMP.DEPT=XYZ" and "EMP.YEARS>20" have true or false values depending on the value for the variables EMP.DEPT and EMP.YEARS.

One area which needs improvement in the Prompted Query system for writing the SQL condition statements is the limitations for specifying the precedence of the predicates. The condition statements can be very complicated with a number of predicates which need to be nested in parentheses in order to specify the precedence for the relationship between the predicates. For example, a query can try to retrieve all employees in a given department who have been there for ten years or employees in a different department who have been there for twenty years or any employee who has been there more than 30 years. The Boolean algebra statement for the condition can be written as: ((EMP.DEPT=XYZ) AND (EMP.YEARS>10)) OR ((EMP.DEPT=ABC) AND (EMP.YEARS>20)) OR (EMP.YEARS>30). The parentheses help to determine the relationship of the predicates for satisfying the condition statement. Prompted query is limited by an inability to provide parentheses for nesting predicates.

When the number of predicates becomes large, and the degree of ordering of the predicates satisfying the queries is complicated, there is a need to indicate the order and relationship between predicates using parentheses. Moreover, it is difficult for the user to construct complicated queries using only the Boolean algebra statement text representation.

Many Boolean statements are logically equivalent; however some are more of an efficient representation of the condition statement. For example, a graph that can be represented by the Boolean algebra statements (P1 AND P4) OR (P3 AND P5) OR (P5 AND P2 AND P5), can also be represented by the Boolean algebra statement (P5 AND (P3 OR (P1 AND P2))) as well as (P1 AND (P4 OR (P2 AND P5)) OR (P3 AND P5). That is, all of the preceding Boolean statements are logically equivalent. However, the latter statement is the most efficient representation with the least repetition of predicates. There is a need when translating between a Boolean representation and a graphical representation that consistency be maintained so that the translations are not confusing for the user.

There is also a need to better represent the flow of the conditions so that the user can more readily understand the results of the query.

In general, there is a need for allowing users to access databases without having to know the complicated syntax of SQL queries.

SUMMARY OF THE INVENTION

In a computerized database system having a central processing unit (CPU), memory, a display device, and a user interaction device, a method is provided for retrieving data. At least one table, column and row are interactively identified containing query data. The rows are identified by means of a condition statement. The condition statement is interactively formulated by the following procedure. At least one flowline is displayed and input is received from the user specifying a position on the flowline for insertion of a predicate and the predicate. The flowline is displayed with the predicate inserted in the specified location. The flowline is converted to a corresponding Boolean algebra statement which is displayed for the user. Additionally, the user can add a predicate to the Boolean algebra condition statement. The Boolean algebra statement is converted to the corresponding graphical representation and displayed for the user. The predicates are displayed on the flowlines in between nodes. Predicates on the same flowline are combined through a logical AND operation. Predicates on different flowlines between the same nodes are combined through a logical OR operation.

The Boolean algebra text representation is converted to the graphical representation by first arranging the Boolean statement into a parse tree. Every element of the tree is processed in preordered traversal where each element in the tree is either a predicate, an OR operator, or an AND operator and predicates are leaves and operators are non-leaves having two children. Each element has a From_Node and To_Node associated with it corresponding to the nodes of the directed graph representation. The root of the parse tree has its From_Node and To_Node assigned the value of the beginning node and ending node of the resulting graph. The children of OR operator elements are assigned the From_Node and To_Node of the OR operator element. For elements that are AND operators, a new node is created. The From_Node of the left child is assigned the From_Node of the AND operator element. The To_Node of the left child and the From_Node of the right child are assigned the new node. The To_Node of the right child is assigned the To_Node of the AND operator element. For predicate elements, an arc is created connecting the From_Node to the To_Node of the element and assigned the predicate.

The graphical flow representation graph is converted to the Boolean algebra statement representation by first compressing the graph and then assigning the Boolean statement values.

The graph is compressed from the inside out down to the fewest nodes and arcs as possible by combining two arcs and replacing the two with one arc with the resulting Boolean algebra statement as the predicate. When two arcs of the graphical flow representation graph have the same To_Node and From_Node, the arcs are combined into one arc with the condition predicates represented by the original arc connected by a logical OR operation which is assigned to the resulting arc. When two arcs are in a series with a node in between and the node only has the two arcs going into and out of it, then the arcs are combined into one arc with the condition predicates represented by each original arc connected by a logical AND operation which is assigned to the resulting arc.

The assignment algorithm identifies unique paths through the graph from the Starting_Node to the Ending_Node. The Boolean algebra statement is created while the compressed graph is traversed. Each path through the graph is comprised of a plurality of predicates combined through a logical AND operation. The Boolean algebra statement text is constructed by determining whether an OR or an AND operator needs to be added to the text statement to correspond to the graphical representation. Also, the predicate and beginning and ending parentheses are added to the text statement. An "OR" is inserted into the Boolean text when a new path has been identified. A stack is used to store each new path through the graph. When the path does not go to the end node of the graph an "AND" is inserted into the Boolean text. After all arcs out of a node have been processed, a new path is popped from the stack. When the stack is empty, a corresponding efficient Boolean algebra statement for the graphical condition is complete.

It is an object of the invention to provide a process by which a database user can formulate queries using a graphical representation to illustrate the flow of the data through condition filters.

It is a further object of the invention to provide a process for consistently translating a condition statement between a graphical flow representation and a textual Boolean algebra statement.

BRIEF DESCRIPTION OF THE DRAWINGS

FIG. 13 is pseudocode of the compression algorithm of FIG. 12;

FIG. 17 is pseudocode of the assignment algorithm of FIG. 16;

FIG. 20 is pseudocode of the Boolean algebra to directed graph algorithm of FIG. 19;

DESCRIPTION OF THE PREFERRED EMBODIMENT

The query flow process conceptualizes the query formulation process in terms of the flow of data through filters which limit what data is to be retrieved.

Figure 1:
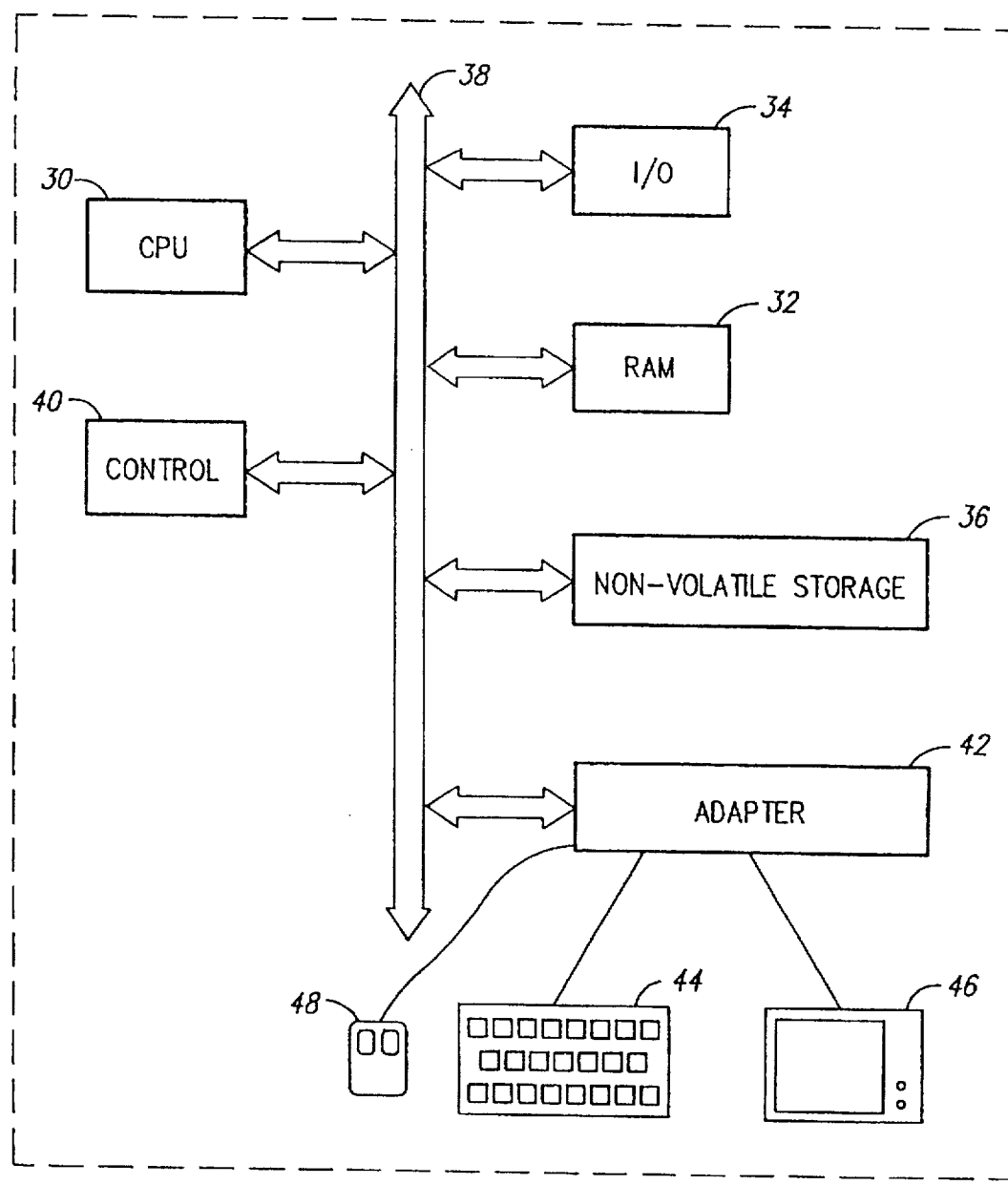
FIG. 1 is a schematic drawing of the computer system.

The user interface for the query formulation process used for retrieving data from a database is implemented in connection with the data processing apparatus shown in FIG. 1. The apparatus comprises a central processing unit (CPU) 30, random access memory 32, input/output port 34, and nonvolatile storage 36 such as disk storage or read only memory (ROM), all connected to a common bus structure 38. Control circuitry 40 performs housekeeping operations, such as providing appropriate clock signals and controlling the operation of the bus. An adaptor 42 is used to interface to other components such as a keyboard 44, a visual display unit 46, and a mouse 48. The general purpose data processor shown in FIG. 1 is used to perform the invention under program control.

Figure 2:
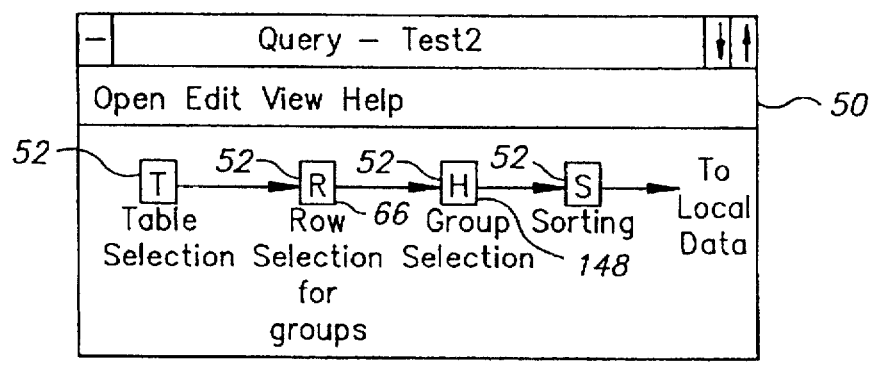
FIG. 2 is an overview of the query flow process.

Referring to FIG. 2, the formulation of the query is displayed for the database user as broken into the sections of table selection, row selection, group selection and sorting of the data to be retrieved. These parts are navigated through by the user to provide the flow of the data through the query.

A window 50 is displayed for the user on the display device with icons 52 representing filters that restrict the flow of data through the query. The user selects an icon to elaborate on a stage of the query formulation process. In that way, the SQL query window is a window in which the user can write any SQL query. Once the SQL query is formulated, it is passed to the database to retrieve the data.

The full SQL statement defines the database tables and columns that form the source of raw data and the conditions that define those rows of interest from the defined database tables. The first icon represents table and column selection which corresponds to the segment of the SQL statement preceded by the word SELECT. The user selects the table icon 55 in order to follow a vet of procedures for interactively identifying the tables and columns which provide the query data.

After the tables and columns are selected, the user next formulates the row conditions for specifying the data to be retrieved. The segment of the simple SQL select statement preceded by the word WHERE contains the Boolean predicates of the a row condition for the query data.

Figure 3:
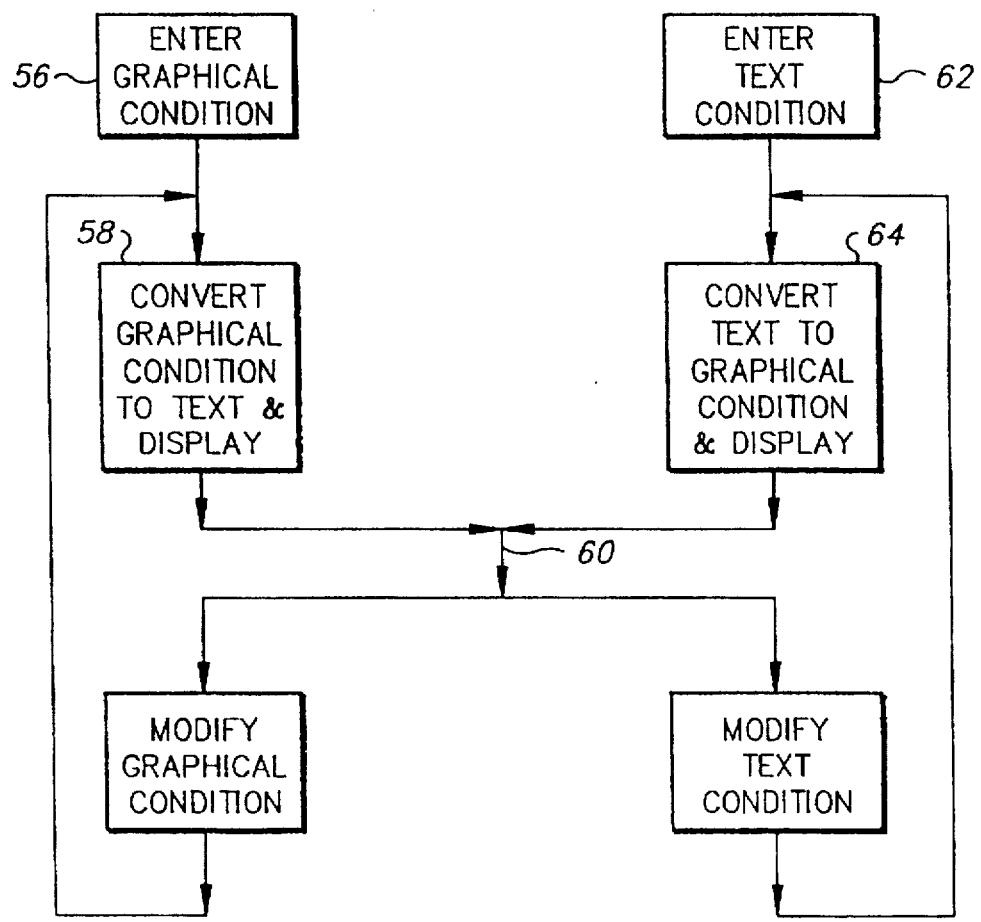
FIG. 3 is a flow chart of the query condition modification process.

The environment for the creation and manipulation of Boolean predicates as used in SQL for restricting row selection can be represented as a directed graph. Referring to FIG. 3, the present invention provides a representation to show the relationship between predicate conditions in a SQL statement WHERE clause on a display screen in two formats, textual and graphical. The user can initially enter a graphical condition 56 by the process discussed below. The system converts the directed graph representation into the corresponding Boolean algebra statement 58 by a process that will be explained below. The user then has the option of directly changing the Boolean algebra statement or the graphical representation 60. When either representation is changed by adding or rearranging predicates, both representations are updated. The user also can initially input a Boolean algebra statement 62 and the system converts the statement into the corresponding graphical representation 64.

Figure 4:
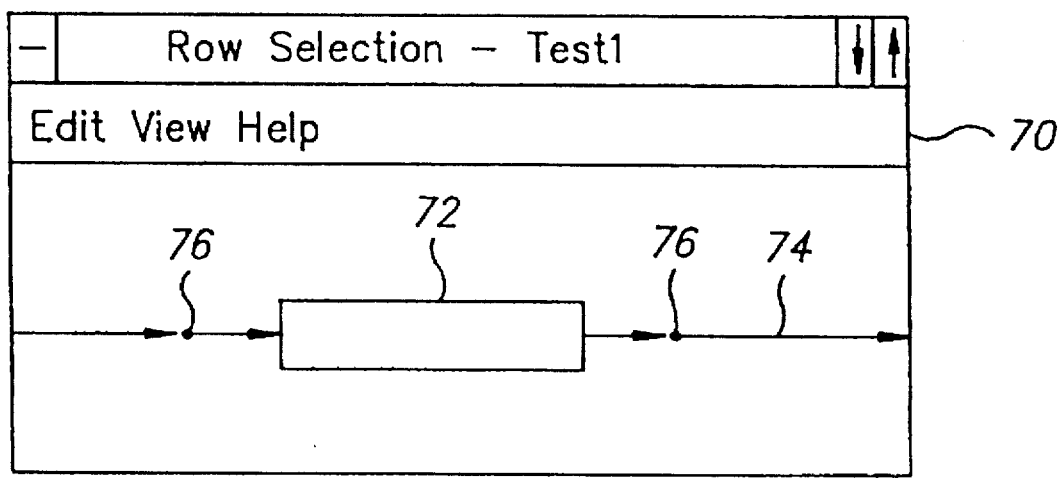
FIG. 4 is an initial row selection window.

The user formulates row conditions by selecting the row condition icon (66 in FIG. 2). Referring to FIG. 4, the initial window display 70 for the row conditions, when no row conditions are present, is an empty predicate box 72 on a flowline 74 between two nodes 76.

The row conditions are graphically displayed in a flowline directed graph format, indicating that data flows through the condition predicates which act as filters. The flowlines intuitively define AND and OR operations for predicates, while also adding order-of-precedence function to the condition. The predicates are placed in boxes on an arc with connectors or nodes shown as small squares between the boxes on the flowlines. The connectors are used for starting and ending points when adding new arcs.

The graphical representation illustrates the condition statement as a domain considered to flow through the set of condition predicates, which act as filters that only let through the domain elements that satisfy the applicable criteria. An AND operation is signified by placing two filters sequentially so any domain element must pass through both filters. An OR operation is shown by creating parallel paths separately containing the filters. The primitives can be combined to produce complex conditions.

In Boolean algebra statements, a user must look at the statement string and match up parentheses to determine the level of nesting for each condition. With the graphical representation, the nesting of predicates is illustrated in a concise manner.

Figure 5:
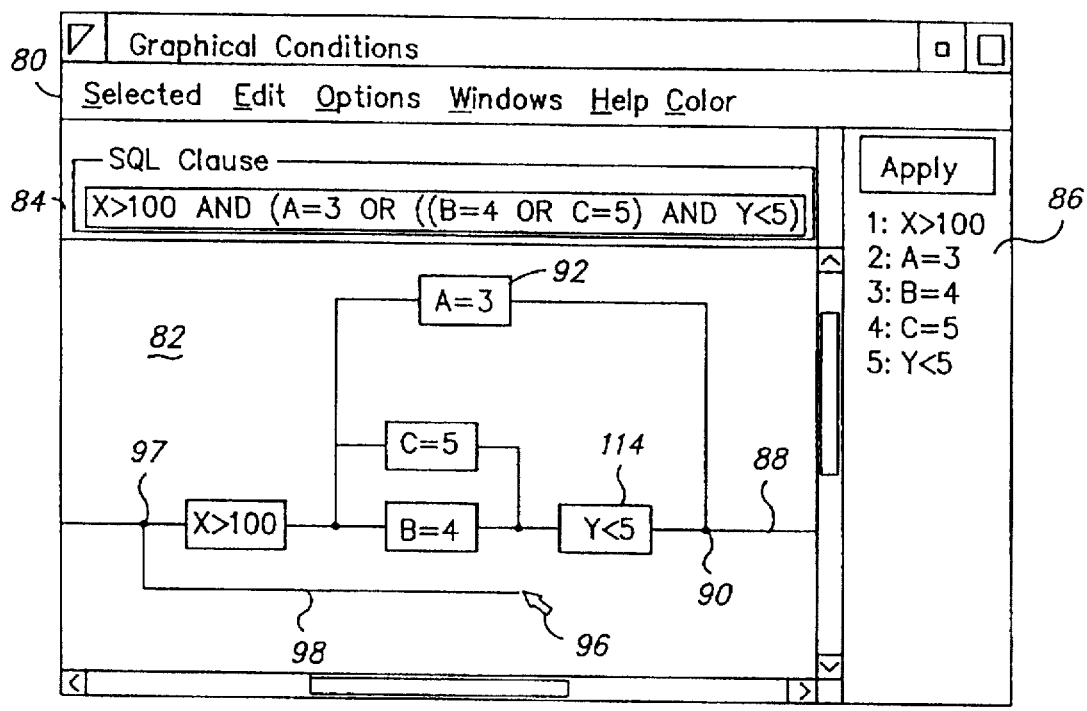
FIG. 5 is a graphical condition window illustrating the addition of a new path.

Referring to FIG. 5, the graphical condition window 80 is divided into three areas: a graph area 82, a text area 84, and a condition area 86. The graph area is where the graph representing the conditions is shown. The text area is the Boolean algebra statement equivalent of the graph. And the condition area contains a list of all the actual predicates.

The graph area contains three elements: at least one or more flowlines 88, nodes 90, and filters 92. The flowlines define the possible paths for domain elements to take as they work their way through the graph. At the flowline coming in from the left hand side, all domain elements are available. The flowline exiting the right hand side has the domain elements that have successfully traversed the graph. The boxes with condition predicate text in them are filters. The filters let only those domain elements that satisfy the condition predicate inside of them pass through. The boxes are on arcs of a flowline between a pair of nodes. The nodes on either side of the condition predicate window on the condition predicate squares serve as starting and ending locations for creating new flowlines.

The user can modify the set of conditions two ways, either using the text area or the graph area. The types of modifications that can be done include inserting, deleting or updating any part of the set of conditions. Modifications using the text area involves over-typing the Boolean statement string. The changes to the Boolean string are displayed on the Boolean string, and also in the graph area. Modifications using the graph area allow the user to add new filters and modify existing filters. New filters can be added as a new flowline connecting existing nodes which is equivalent to adding a logical OR operation. Additionally, new filters can be inserted into an existing flowline which is equivalent to adding an AND operation.

A predicate can be combined with another predicate through a logical OR operation by adding a new flowline to the graph between two existing nodes. As shown in FIG. 5, the user places the mouse pointer 96 on a node 97 and presses the selection button. While holding the selection button down, the mouse is moved off the node. A line 98 appears from the original node to the mouse pointer, indicating a new path that is being drawn. Eventually the mouse is moved to another node and the selection button is released. In this way, a path can be drawn between two nodes to create the new flowline.

Not all nodes are valid for the ending of a new path depending on the starting node. That is, no new path may be created that results in a circular path existing in the graph. A circular path is one in which it is possible to start at a node, traverse the graph and eventually end up back at the same node. When the mouse is over an invalid node, the user is notified that an invalid flowline would be created.

Figure 6:
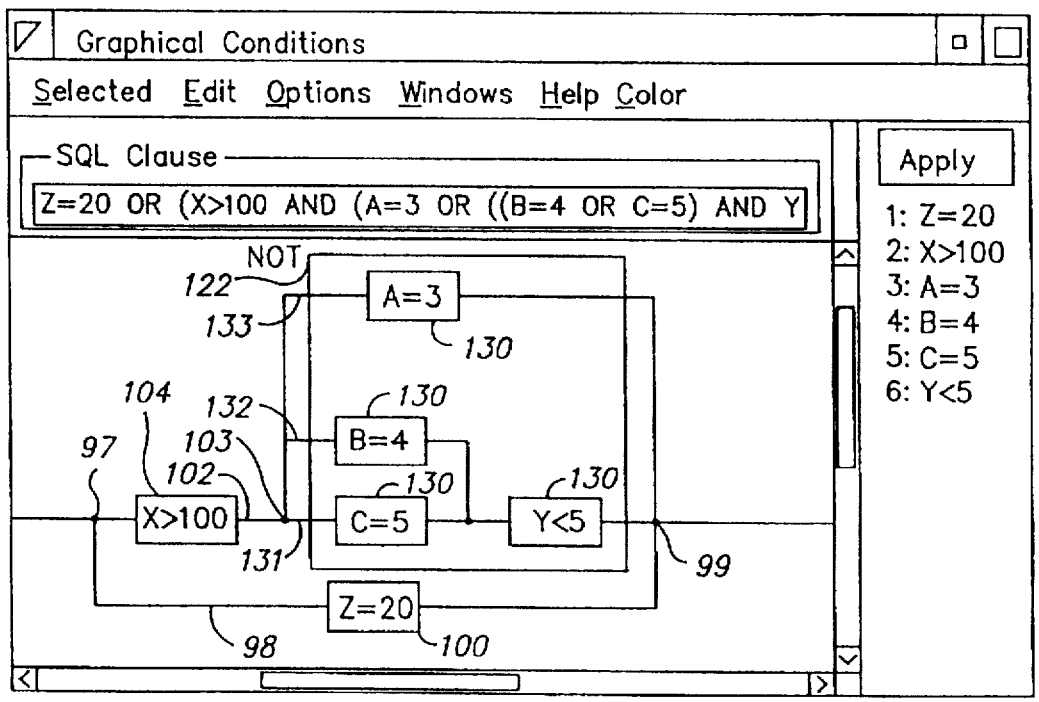
FIG. 6 is the graphical window condition of FIG. 5 illustrating the addition of the new path and a NOT operation.

After the new line is completed, the user is prompted to enter the predicate text assigned to that arc. The predicate text is placed inside the filter and the new graph is displayed for the user. Referring to FIG. 6, the line 98 was drawn to the node 99 following the predicate Y<5 and the predicate Z=20 was added to the predicate filter box 100.

Predicates can be combined through a logical AND operation in the graphical representation by inserting a filter into an existing flowline. The user places the mouse over the position on the flowline where the new filter is to be entered and double clicks the mouse selector button. A new filter is inserted at that location, and any new nodes that are required by the new filter are inserted. The user is then prompted for the predicate text to fill in the filter.

Referring to FIG. 6, the flowline containing predicates X>100, C=5, and Y<5 are all combined using a logical AND operation. When the predicate X>100 was added to the flowline 102, prior to the insertion of the predicate Z=20, the mouse cursor was positioned over the node 103 to the left of the predicate B=4, a new node 97 and predicate filter box 104 were inserted into the flowline 102 containing predicates B=4 and Y<5, and the user input the predicate value X>100 in the predicate box 104.

There are other methods for interactively inserting predicates and flowlines that are well known to those skilled in the art.

Referring to FIG. 5, the Boolean algebra statement equivalent of the graphical flow representation is shown in the SQL clause box 84. After the insertion of the predicate Z=20 in the selected location in the graphical flow representation, the equivalent Boolean algebra statement that will be displayed is Z=20 OR (X>100 AND (A=3 OR ((B=4 OR C=5) AND Y<5))) (partially shown in FIG. 6).

Predicates can be modified by selecting them and then selecting the modification functions from a pop-up menu window. A predicate is selected by drawing a box around the desired filter using a mouse or similar user interaction device. More than one predicate filter can be selected at one time by drawing a box around all the desired filters. The selected predicate filters can be edited where the predicate text in the filter box is changed using a separate window for filling in an edited predicate text. The filter can also be deleted, at which time the flowline arc for the filter is also removed. When the deletion of a filter results in the two nodes that used to be connected by the flowline arc becoming unconnected by the deletion of the filter, the nodes are merged into one node.

Referring to FIG. 6, the conditions on the flowline can also be negated by drawing a box 122 around the predicate filter or filters to be negated. To add a box to indicate negation, a mouse or other user interaction device is used to select one or more condition predicates. Next, a negate option is selected from a menu. After the insertion of the NOT operation to the selected section 122 of the flow graph, the resulting Boolean algebra statement is Z=20 OR (X>100 AND NOT (A=3 OR ((B=4 OR C=5) AND Y<5))).

Only predicate filters that form a valid subgraph may be negated together. It is a straightforward process to determine a valid subgraph based on the flowlines entering and leaving the set of selected predicate filters. Only one logical flowline can enter the set of selected filters from the outside non-selected filters, and only one logical flowline can leave the set of filters. One logical flowline is defined as either one actual flowline entering the set or two or more flowlines entering the set immediately originating from the same node. One logical flowline leaving the set is defined in much the same way. It is either one actual flowline or all flowlines immediately ending at the same node.

In the example shown in FIG. 6, the filter predicates A=3, B=4, C=5 and Y<5 130 are selected, three flowline arcs 131-133 enter the set of selected filters, one each to filters A=3, B=4 and C=5. However, this is one logical flowline since they all start from the same node 103. Also, all flowlines leaving the selected filters end at the same node 99. However, the filter Z=20 could not be included in the NOT operation since the set would then have four flowline arcs entering, where three of the flowlines originate from one node 103 while the fourth flowline enters from a different node 97. Since the flowlines originate from separate nodes, this is not a valid subgraph to negate. The negate choice is therefore unselectable on the menu.

Figure 7:
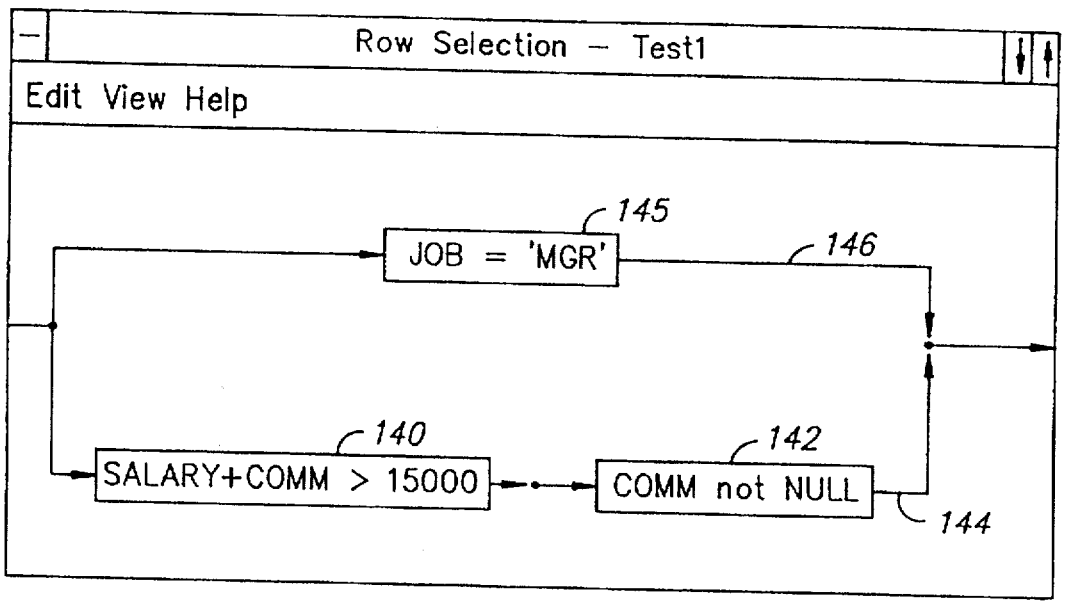
FIG. 7 is a row selection window with three row predicates.

Another example of a row condition formulation is illustrated in FIG. 7 where a user wants to restrict the rows of the query to all managers or commissioned employees whose total earnings are above $15,000. Initially, one predicate box appears in the row selection window. The user inputs the row condition predicate which is placed in the predicate box. The first predicate in the example is the restriction on the data to all employees who earn more than $15,000 140. A second predicate is then added to restrict the group to employees who earn a commission 142. Following the procedure for insertion of a new predicate as part of an AND operation, a second predicate box connector and prompt panel are provided for the user to enter the predicate for the new filter predicate which in this example is "COMM not NULL" 144. In order to add the predicate of the job being a manager 145, a new flowline 146 is created.

Figure 8:
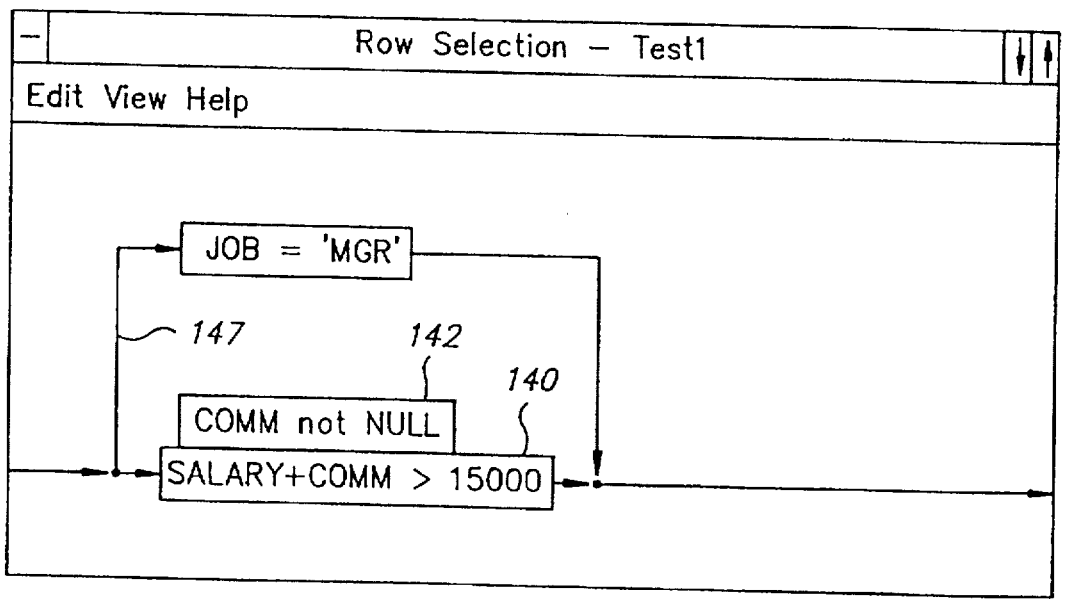
FIG. 8 is the row selection window of FIG. 7 with the predicates in a stacked format.

Referring to FIG. 8, the user may view the flow diagram in a stacked format 147 which stacts the predicates 140, 142 that are connected by the AND operator.

The condition formulation process can also be used for GROUP conditions. Once the user provides input to the system that forces the generation of groups, such as placing a summary function as part of the column selection process, then a Group conditions icon (see 148 in FIG. 2) appears along with additional text under the row selection icon. For example, when the user selects the columns, department, job, and average salary from a table, the top level query window (FIG. 2) shows the flow of data as being from table selection, into row selection for groups, into group selection, into sorting.

Figure 9:
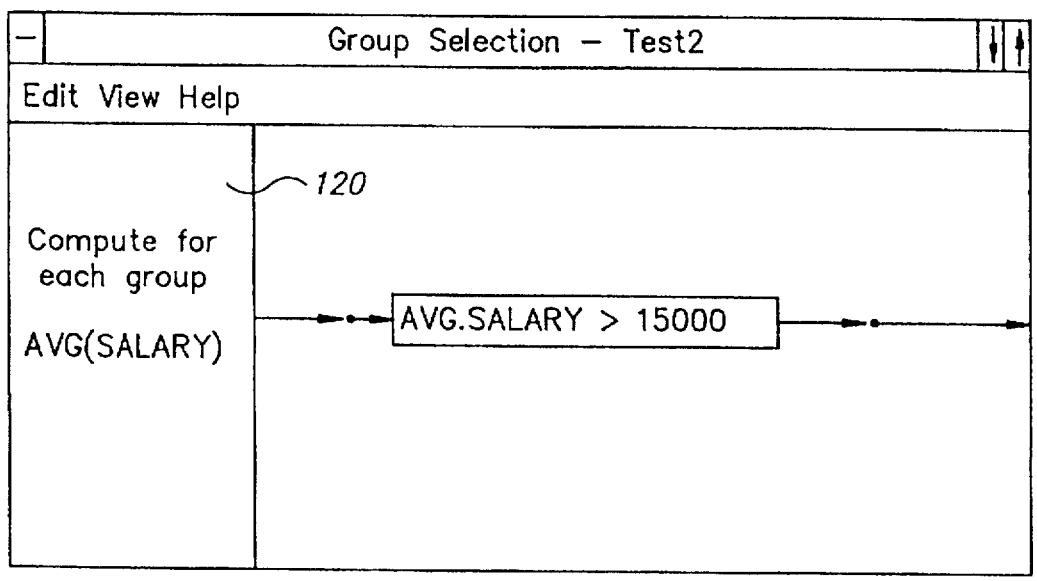
FIG. 9 is a group selection window.

Inside the row selection window, the grouping column information is shown on the right hand side of the window. Nothing in the grouping column section can be directly updated. To change the grouping columns, the user must go back and select or delete columns included in the query. Selecting the group selection icon causes a window (see FIG. 9) to be displayed showing a flowchart condition format. The left hand side of the group selection window 120 has information about which overall aggregate functions are computed. The list displays for the user what functions are being evaluated for the query and helps in the continuity of the flow from the row selection window.

The process for formulating conditions for groups is the same as for any conditions except that the group selection prompt panel has information about summary functions.

Following the selection of the table and columns for the query data and the formulation of the condition for the row or group selection, the next step in the query formulation process is the sorting of the query data. The sorting function window initially displays only a flowline and connectors. The user adds a sort column by placing the mouse cursor over the connector and pressing the mouse button. The user then drags the connector either above the line for ascending order or below it for descending order and releases the mouse button. A sort box appears on the selected side of the line, along with a list box that has all the selectable columns for sorting. After the user selects a column from the list box, it is displayed in the sort box.

Figure 10:
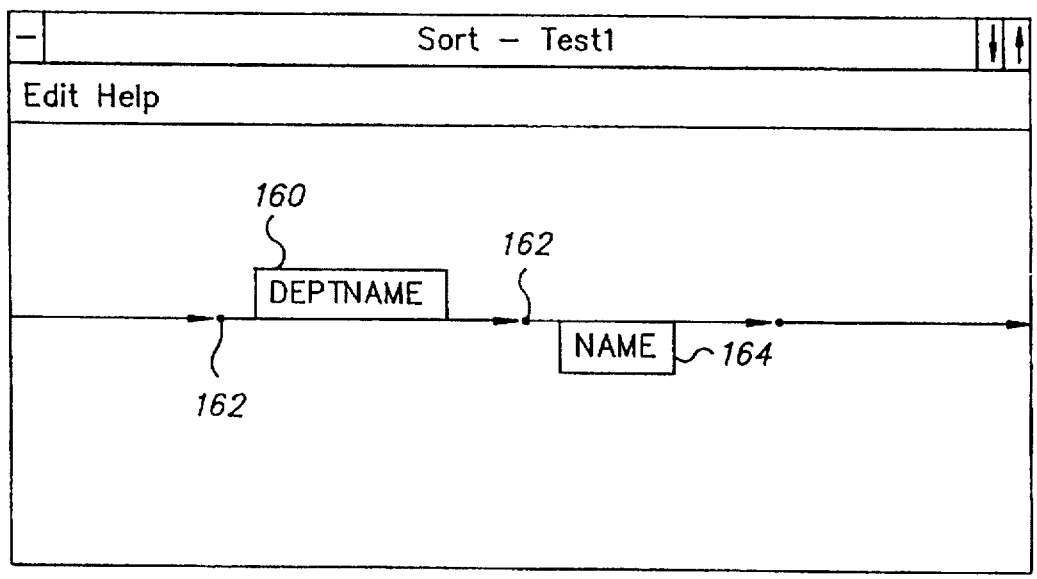
FIG. 10 is a sort window with sort columns.

Referring to FIG. 10, the user has selected sorting first by department name in ascending order and then by employee name in descending order. After department name was selected from a list box of columns and placed in the sort box 160, additional connectors 162 were displayed so that additional sort boxes could be created on either side of the existing sort box 164. The connector to the right of department name was selected and dragged downwards for the employee name sort. The order of precedence for sorting reads from left to right. Any sorts on the left of any other sort gets applied before the right hand sorts, so that the sort by descending employee name is less significant than the department name sort.

Figure 11:
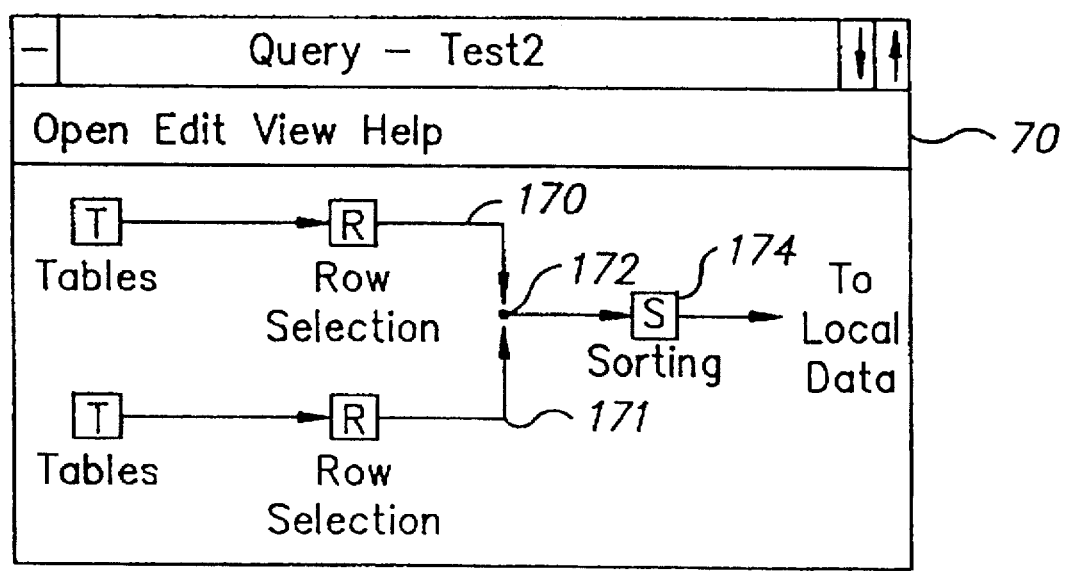
FIG. 11 is an overview of the query flow process with UNION.

The formulation of queries involving the UNION operation between two or more sub-queries uses an initial query flow window shown in FIG. 11. The selected rows of data are combined by a UNION function 172 and then sorted 174. The UNION operation is selected from an action bar pull-down menu in the graphical query overview window. When the UNION operation is selected, the query flow diagram as in FIG. 11 is displayed as part of the overview window. The user enters the table, column, and row selections for the queries by expanding the icons to specify query details. After the tables and columns are selected for a second query, the selected columns are verified against the first query to make sure the number of columns and their data types match, which is required for SQL UNION operation. After the row selections are made for each query, the query data are combined by a UNION operation.

The directed graph of the graphical flow representation for the row conditions is displayed as a Boolean algebra statement so that the user can view the row conditions in both formats for greater understanding. The directed graph is converted to a Boolean algebra statement using the algorithm in FIGS. 13 and 17. The Boolean statement is converted to a directed graph using the algorithm in FIG. 20.

In general, a graph is a set of one or more nodes connected by zero or more arcs. Pictorially, nodes can be represented by squares, while arcs can be represented by lines connecting the squares. The identification for the nodes can be placed inside the squares. Arcs can be identified by a name placed by the line or by referring to the two nodes that the arc connects. A graph can be defined as either a list of nodes or a list of arcs.

A directed graph is a subset of a graph where the arcs indicate direction. Pictorially directed graphs are shown by means of arrows on the arcs. In the list format, directed graph arcs have From_Nodes and To_Nodes listed. A further subset of directed graphs are ones that have only one starting node and one ending node and no circular path.

It is possible to have a directed graph that has no Boolean condition that is exactly equivalent. However, it is always possible to generate a Boolean condition that is logically equivalent.

In this invention, the graphical flow representations are directed graphs with no circular paths. The actual conditions are represented by the arcs, whereas the nodes are placed according to the structure of the AND and OR statements in the conditions.

Figure 12:
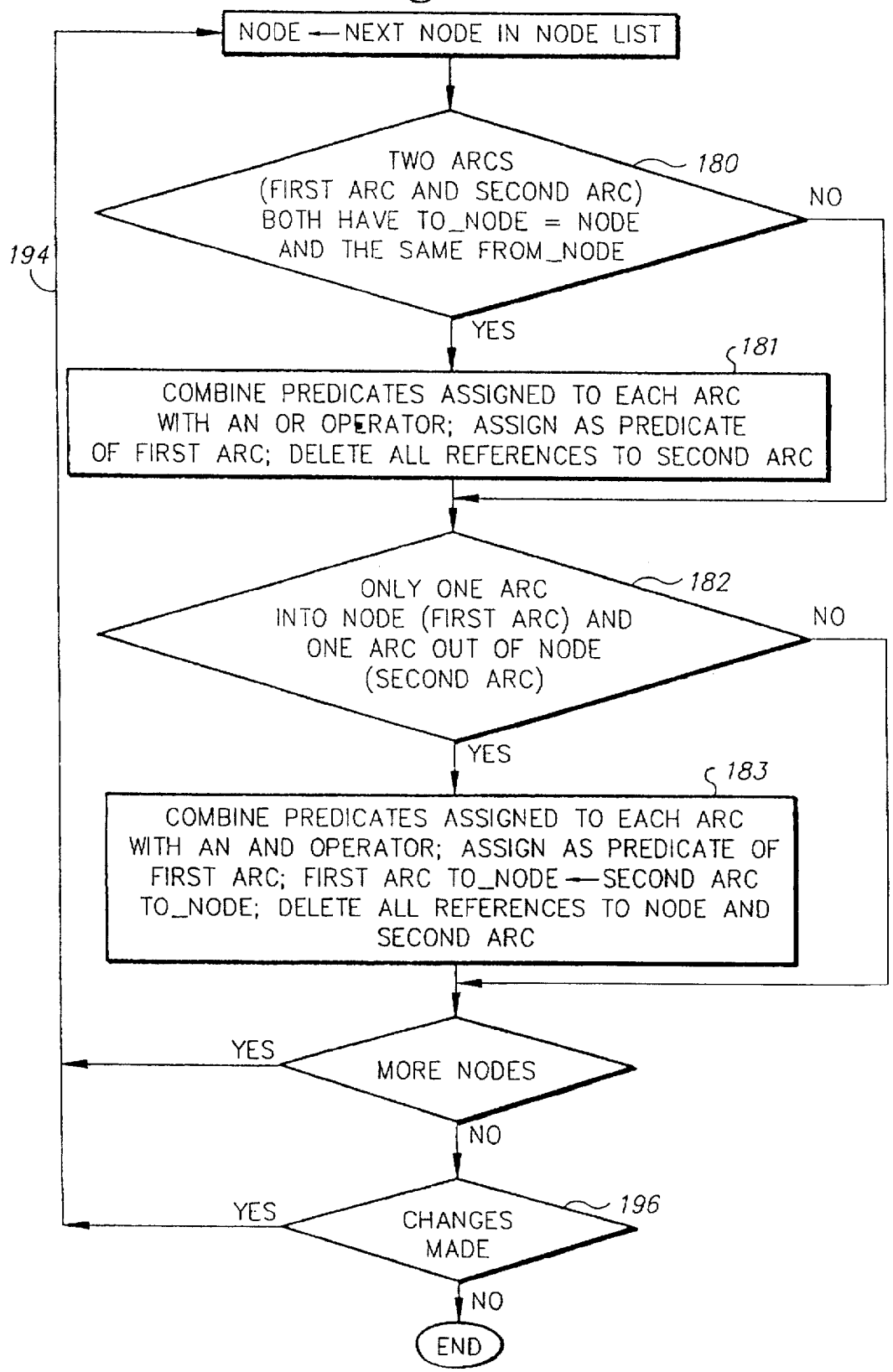
FIG. 12 is a flowchart of the compression algorithm.

This invention converts the directed acyclic graph of the query flow representation to the corresponding Boolean algebra statement by first using a compression algorithm as shown in FIGS. 12 and 13. The graphs are compressed from the inside out, down to as few nodes and arcs as possible. The compression algorithm always tries to combine two arcs and replace it with one arc. When two arcs have the same To_Nodes and From_Nodes 180, the arcs are combined into one arc, with the condition represented by each original arc connected by a logical OR operation 181. When two arcs are in a series with a third node in between, and the third node only has those two arcs going into and out of it 182, then the arcs are combined into one arc with the condition represented by each original arc connected by a logical AND operation and the intervening third node is eliminated 183.

The goal is to compress the graph down to only two nodes and one arc, which is a completely reduced graph. However, in some cases, the graph cannot be completely compressed. After the graph is compressed to its minimum number of nodes and arcs, the graph is converted to a Boolean algebra statement using an expansion and assignment algorithm.

Figure 14:
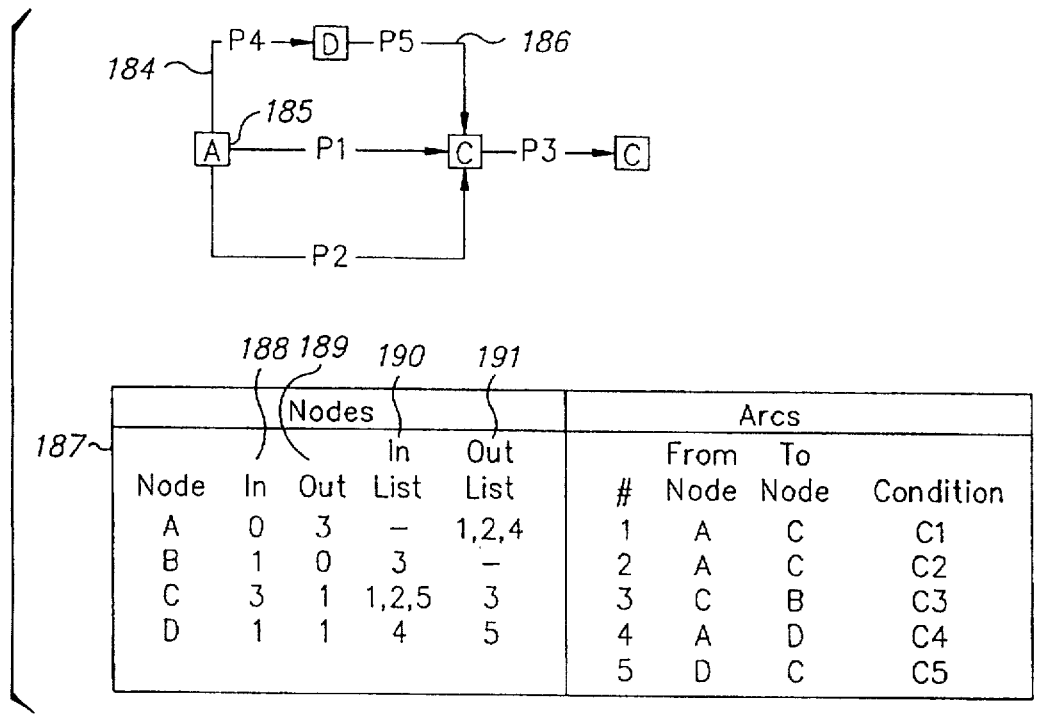
FIG. 14 is an example of an initial graph and representation.

The compression algorithm can be further explained using the simple graph shown in FIG. 14. The graph 184 consists of four nodes (A, B, C and D) 185 and five arcs (1 through 5 with predicates P1 through P5, respectively, assigned to each arc) 186. For each node in the graph, the following information is stored in a table 187: the number of arcs going into the node 188, the number arcs going out from the node 189, the list of the arcs going into the node 190, and the list of arcs going out from the node 191.

During the processing shown in FIGS. 12 and 13, the node table (185 in FIG. 14) is processed in a loop 194, with each iteration trying to combine arcs. The loop is terminated when one complete pass through the node array results in no arcs being combined 196. Where two arcs go out of the same first node and into the same second node 180, the predicate values are combined with an OR operator and assigned to the first arc, and references to the second predicate are removed 181. For nodes where only one arc goes into the node and one arc comes out of the node 182, the predicate values are combined by an AND operation and assigned to the arc going into the node, and that arc is assigned to go into the node of the second arc 183.

In processing the example graph shown in FIG. 14 (according to the algorithm of FIGS. 12 and 13), the first iteration skips nodes A and B since neither meet the criteria for compression. However, since node C has more than one arc going into it (197 in FIG. 13), the list of arcs going into it (arcs 1, 2 and 5) are each examined 181. Since arcs 1 and 2 both go out from the same node the predicates are connected by an OR operator and assigned to arc 1. All references to arc 2 are deleted. Next, since node D has an in arc count of 1 and out arc count of 1, it is removed. The predicates of the two arcs going into and out of node D are combined by an AND operator and assigned to the first arc. The first arc To_Node is updated with the To_Node of the second arc and the second arc is deleted.

Since changes were made during the last iteration or pass (arcs 1, 2 and 4, 5 combined) another pass of the node array is performed. At the end of the first pass, Node A has zero arcs going into it and two arcs (arcs 1 and 4) going out, Node B has one arc (arc 3) going into it and zero going out of it, Node C has two arcs (arcs 1 and 5) going into it and one arc (arc 3) going out of it. Node D has been deleted. Arc 1 has the predicate (P1) OR (P2) assigned to it, arc 2 has been deleted, arc 3 has the predicate P3 assigned to it, and arc 4 has the predicate (P4) AND (P5) assigned to it.

On the second pass, Node C is examined because it has an in arc count greater than one. Examining the list of arcs going into Node C shows that both arcs 1 and 4 have the same From_Node, Node A. Therefore, the two arcs, 1 and 4, are combined with an OR operation. At the end of the second pass, Node A has zero arcs going into it and one arc (arc 1) going out, Node B has one arc (arc 3) going into it and zero arcs going out of it, Node C has one arc (arc 1) going into it and one arc (arc 3) going out of it. Arc 1 has the predicate ((P1) OR (P2)) OR ((P4) AND (P5)) assigned to it, arc 3 has the predicate P3 assigned to it, and arc 4 has been deleted.

On the next loop of the node array, Node C has an in arc count of one and an out arc count of one. The arcs going into and out of Node C are combined by an AND operator. The result of this compression operation is a reduced graph down to the minimum possible graph of two nodes and one arc, 200 in FIG. 15. There are two nodes A and B and the predicate assigned to the arc AB is ((P1) OR (P2)) OR ((P4) AND (P5)) AND (C5).

Figure 18:
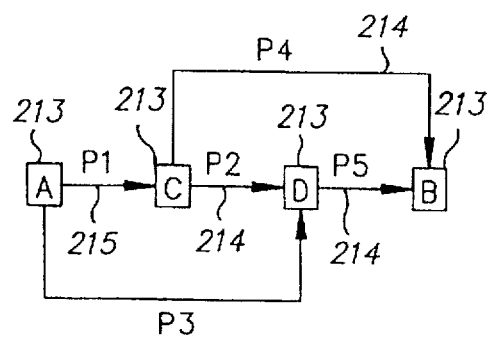
FIG. 18 is a fully compressed graph initialized for the assignment algorithm.

The foregoing example is not always the situation. The graph 201 shown in FIG. 18 is an example of a graph where the node and arc arrays cannot be compressed any further, but it has not been reduced to two nodes and one arc.

Figure 16A:
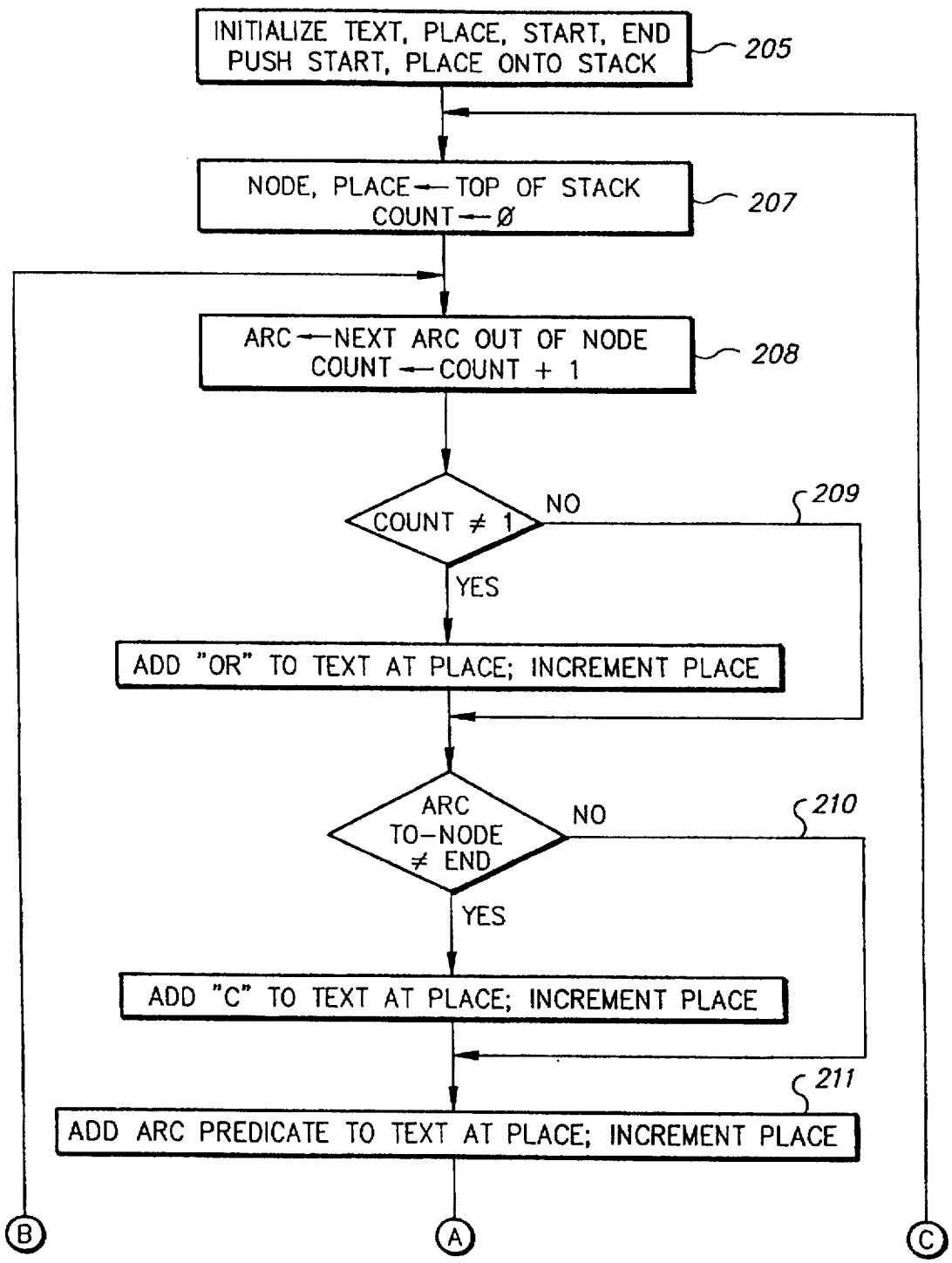
FIG. 16 is a flowchart of the assignment algorithm.
Figure 16B:
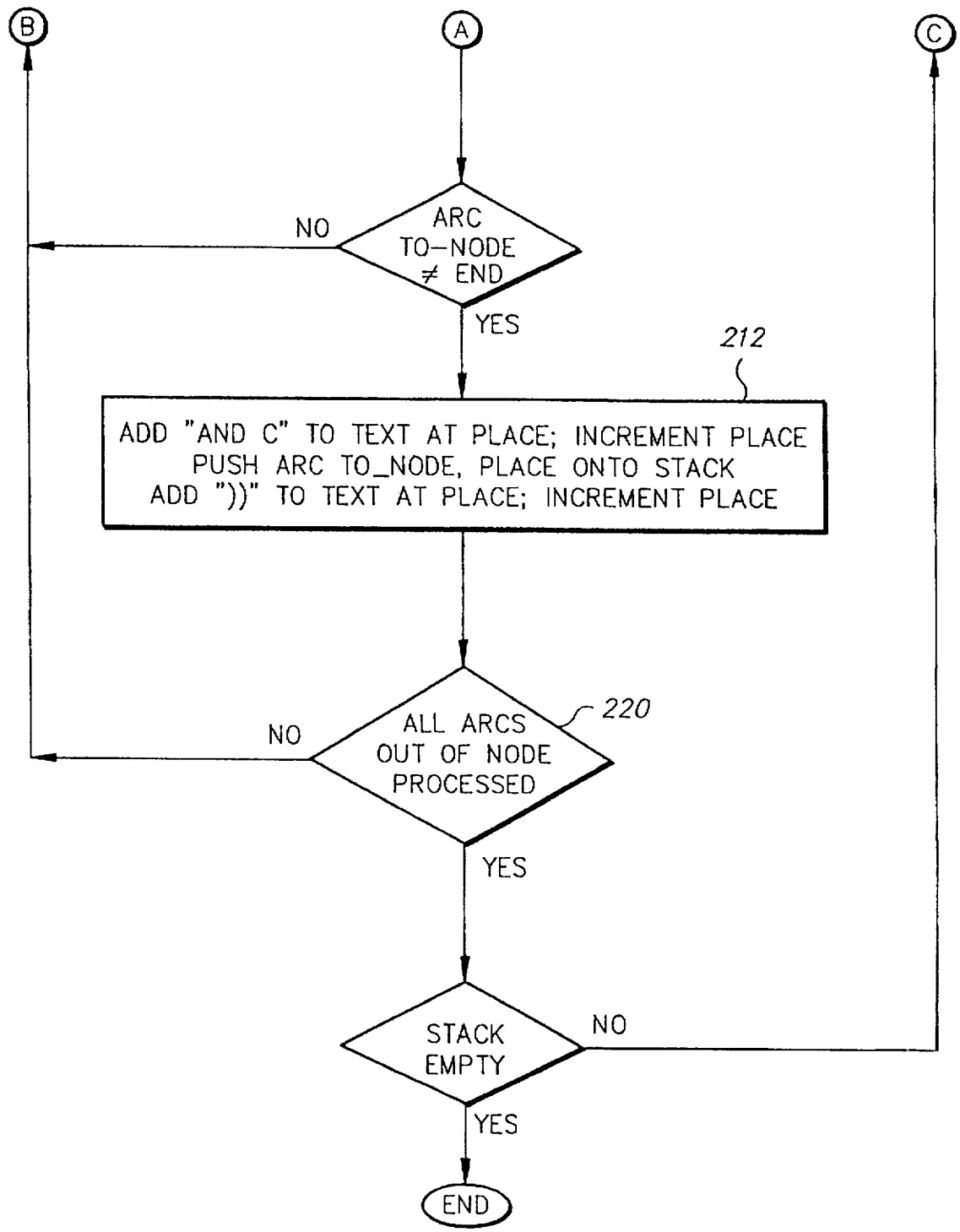

The assignment algorithm in FIGS. 16 and 17 assigns the corresponding Boolean algebra statement regardless of whether the compressed graph is fully reduced.

The assignment or expansion algorithm tries to find each unique path through the graph from the starting node to the ending node. The graph itself is not manipulated any further. Instead, the Boolean text string is created while the graph is being traversed. Since only one path can be traversed at a time, a stack is used to keep track of each new path through the graph. When the stack is empty, no more paths are to be processed; and the Boolean condition is complete. The expansion algorithm traverses each path through the graph building the Boolean algebra statement string along the way. The algorithm inserts part of the text into the main string a piece at a time. The list of places that need to have text inserted is kept on the stack.

Figure 15:
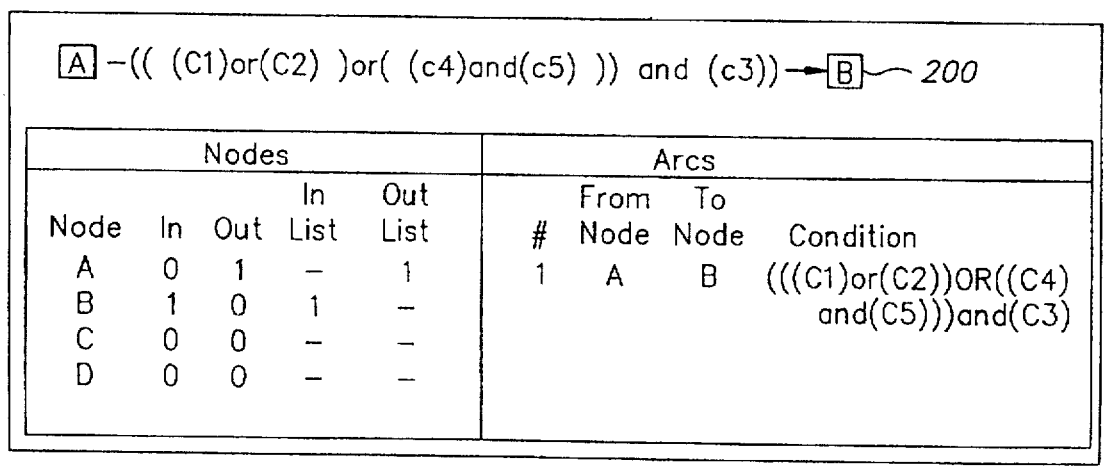
FIG. 15 is the graph of FIG. 14 after arcs have been combined using the compression algorithm of FIGS. 12 and 13.

When a graph has been reduced down to two nodes and one arc such as the compressed graph in FIG. 15, the expansion algorithm has little to do since only one possible path exists from start to end.

Referring to FIGS. 16 and 17, the first step is the initialization of the variables for the expansion algorithm 205. Two of the variables are the start node (the starting node of the graph) and the end node (the ending node of the graph). The start and end nodes can be determined from the in and out arrays used in the compression algorithm. The start node has an in-arc-count of zero and an out-arc-count of greater than zero. The end node has an in-arc-count greater than zero and an out-arc-count equal to zero. Another variable the Boolean Text, is the text string that holds the Boolean algebra statement. The text variable has an initial value of null.

A stack holds the pair of items, a node value and a text position pointer. The node represents where in the graph the current process is active, while the position pointer is where the insertion into the text string is occurring. The start node and a place value indicating the start of the text is initially pushed onto the stack.

After initialization is complete, the graph is continually processing nodes stored in the stack until the stack is empty. The top values are popped from the stack and placed into the variable's current node and current place and the arc count is set to zero 207. For each arc in the graph, if the From_Node for the arc is the same as the current node, then the arc count is incremented by one 208. If the arc count is greater than one, then the text "OR" is inserted into the Boolean text at the location defined by the place variable, and the place variable is incremented to point after the inserted text 209. When the To_Node for the arc is not the same as the end node (the arc does not go to the end node), then a begin parenthesis "(" is placed into the Boolean text at the location defined by the place variable and the current place is incremented so it points after the inserted text 210. The predicate text assigned to the arc is inserted into the Boolean text at the location defined by place, and the place is incremented to after the insertion 211. If the To_Node for the arc is not the same as the end node, then the text AND and a begin parenthesis is placed into the Boolean text at the location defined by place, and the place variable is incremented to after that text position; the arc's To_Node and the place variable are pushed onto the stack; and the text of two end parentheses "))" is also added to the text at the location of the place variable and the place counter variable is incremented 212.

The expansion algorithm can be further explained using the example in FIG. 18 showing a fully compressed Graph 201. In the example, there are four nodes, A, B, C, and D 213 and five arcs 1 through 5 with predicates P1 through P5, respectively, assigned to each arc 214. As listed in the node array 215 (and shown in the graph 201), Arc 1 goes from Node A to Node C, Arc 2 goes from Node C to Node D, Arc 3 goes from Node A to Node D, Arc 4 Goes from Node C to Node B, Arc 5 goes from Node D to Node B. From looking at the arcs into nodes and arcs going out of the nodes it can be determined that node A is the starting node and node B is the ending node. The stack 216 after initialization holds node A and the value for the position variable (also called "Place") of 1.

Node A and the Place value of 1 are popped off the stack. The arc list is searched for any arcs that have Node A as the From_Node and the first arc, Arc 1, is identified. The Arc count variable is incremented one. Since the To_Node of Arc 1, Node C, is not the end node, Node B, a left parenthesis is added to the text at the position of Place (210 in FIG. 16). Next, the actual predicate text associated with Arc 1, P1, is placed into the string text variable at the position of Place (211 in FIG. 16). Next the word AND is added along with the left parenthesis. The To_node of arc 1, Node C, and the current value of Place (right after the AND and left parenthesis), is pushed onto the stack. Finally, two right parentheses are placed into the string and the Place variable incremented to that position (212 in FIG. 16). At the end of the first iteration, the Boolean text has the value of "(P1 AND ( ))" and the current value of Place is following the right most end parenthesis; also, the Node C and the Place value following the "AND (" were pushed onto the stack.

The process continues identifying more arcs having node A as the From_Node (220 in FIG. 16) and Arc 3 (P3) is identified. The arc count variable is incremented to two (indicating that the current node has two arcs out of it, which means that there is an OR operation between the predicates on the arcs. The text "OR" is placed in the string at the current place (after the right most parenthesis). Since the To_Node of Arc 3, Node D, is not the end node, the same thing is done as for the previous arc, arc 1. That is, at the end of this iteration the Boolean text is "(P1 AND ( )) OR (P3 AND ( ))" (P3 being the predicate assigned to Node D) where the Place variable is at the end of the right most parenthesis and the stack has Node D and the position pointer (Place) following the string "P3 AND (" pushed onto it in addition to the Node C and Place value following "P1 AND (".

Since no other arcs have the current node, Node A, as the From_Node, a new node is popped from the stack, Node D, and a new Place pointer value, following the text "P3 and (", are assigned as the current Node and Place values. There is only one arc with Node D as its the From_Node, Arc 5. Since the To_Node of Arc 5 is the end node, Node B, all that is done is the addition of the predicate text assigned to Arc 5 to the text variable at the location of the current Place. At the end of this iteration, the text string is "(P1 AND ( )) OR (P3 AND (P5))" and the stack still has Node C and the Place value following "P1 AND (".

The stack is popped again to get the value for the current Node of Node C and the place value following the text segment "P1 AND (". The first arc found with the Node C as its From_Node is Arc 2. Arc 2 has Node D as its To_Node (which is not the end node). The arc count for the current Node has the value of one and the predicate P2 is assigned to arc 2. The process is similar as before. The resulting text string is "(P1 AND ((P2 AND ( )) )) OR (P3 AND P5)) with the Place pointer pointing after "( ))". The stack contains Node D and the Place value pointing to the position after "P2 AND (". The next arc with Node C as its From_Node is Arc 4 with the predicate P4 assigned to it. The arc count is incremented to two. The To_Node of Arc 4 is the end node, Node B. The resulting text string after this iteration is "P1 AND ((P2 AND ( )) OR (P4)) OR (P3 AND (P5))".

Since there are no other arcs with Node C as its From_Node, the stack is popped and the current Node is Node D and the current Place is the position after "P2 AND (". The only arc with Node D as its From_Node is Arc 5 with the predicate P5 assigned to it. Since the arc count is one and the To_Node of Arc 5 is the end node. The only operation to be done is inserting P5 at the current place position. The resulting text is "P1 AND ((P2 AND (P5)) OR (P4)) OR (P3 AND (P5))". After Node D is processed, the loop terminates because the stack is empty and the final text value for the Boolean algebra statement has been completed.

The expansion graph algorithm could be used on its own without the compression algorithm. However, the Boolean text that is created does not always produce a Boolean algebra statement that is the exact mapping of the graph. For example, the same graph where text output from the expansion graph is: ((C1) AND (C3)) OR (C2 AND C3) has the text output from the expansion algorithm after going through the compression algorithm of: (C1 or C2) and C3. The latter Boolean expression is a more efficient representation and more of an exact translation from the corresponding graph.

Figure 19:
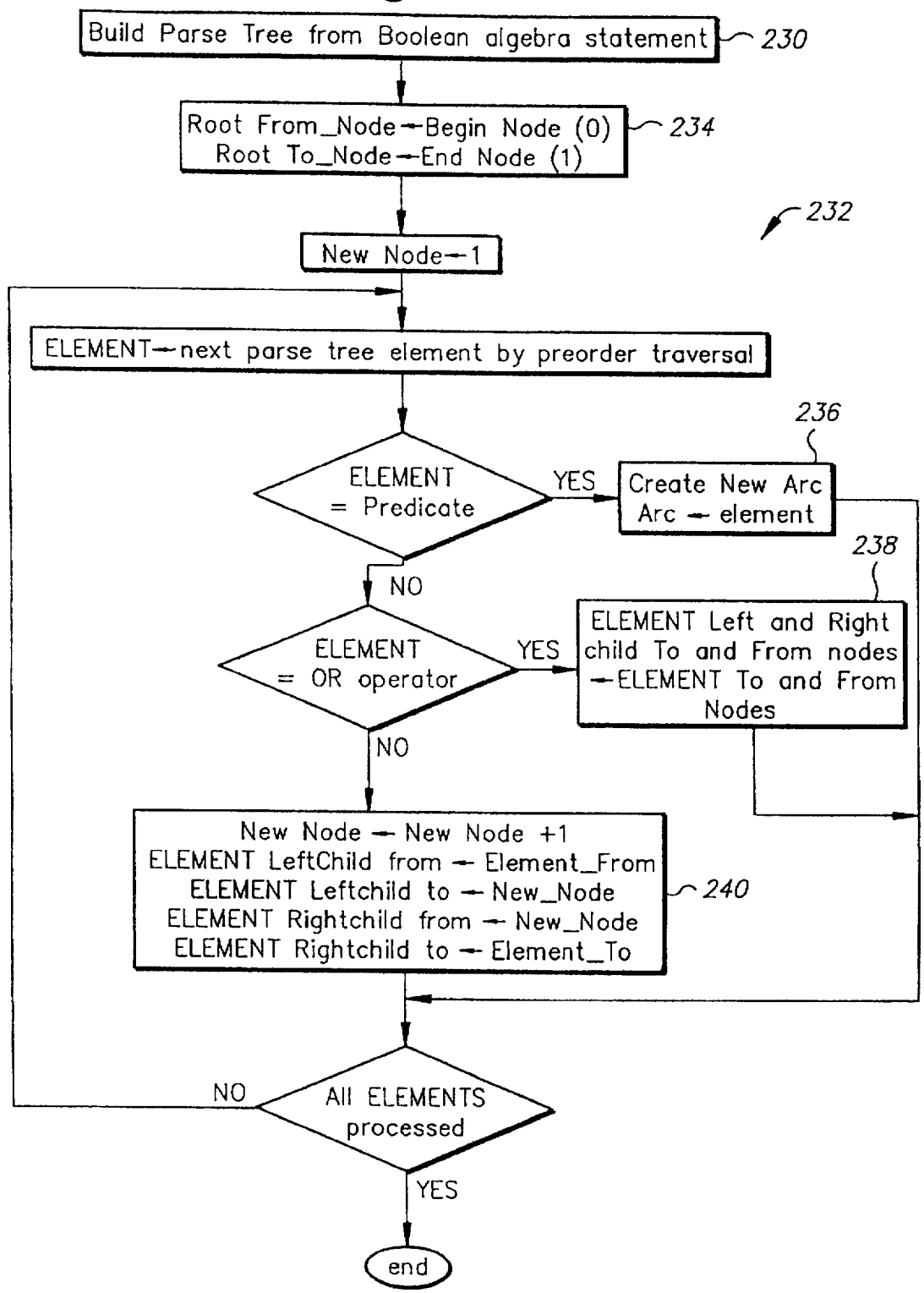
FIG. 19 is the flowchart of the Boolean algebra to directed graph algorithm.

The Boolean algebra statement is converted to the graphical flow representation using the Boolean statement to directed graph algorithm in FIGS. 19 and 20. The algorithm takes a textural Boolean statement such as (X>1) AND (Y=2) and produces a corresponding directed graph. The directed graph can then be displayed or modified by other methods.

There are two parts to the algorithm. The first part is creating a parse tree of the Boolean expression 230 and the second part is the graph creation algorithm using the parse tree 232. The parse tree consists of leaves and non-leaves. One non-leaf is the root element. All Non-leaves have two children, a left child and a right child. Each element in the parse tree is either a predicate, an OR operator, or an AND operator. The leaves on the tree are always predicates while non-leaves are operators. The creation of the parse tree is known methodology and will not be explained in detail here. After the parse tree is created, the tree is traversed creating the nodes and arcs that make up the directed graph.

The graph creation algorithm begins by assigning a To_Node and From_Node value to the root of the tree 234. Then the algorithm processes every element in the tree by preordered traversal.

When the element represents a predicate such as X>1, then an arc is created connecting the element's From_Node to its To_Node by an arc having the element's predicate assigned to it 236. The From_Node and To_Node were assigned when processing the element's parent connector. When the element represents an OR operator, the element's From_Node and To_Node are assigned as From_Node and To_Node for both of the element's children 238. In that way, when the child elements are processed, their To_Node and From_Node values have already been assigned. When the element represents an AND operator, then a new node must be created in between the current From_Node and To_Node. The left-hand child has its From_Node set to the same as the From_Node of this operator. The new node is assigned as the child's To_Node. This same new node is also assigned to be the right child's From_Node. The right child's To_Node is the same as the To_Node of the operator 240. This has the effect of inserting a new node between the elements. In that way, all child elements of AND operators have their To_Node and From_Node values assigned.

The conversion of a parse tree of a Boolean statement to a directed graph can be further explained with reference to the parse tree 250 in FIG. 21. The parse tree 250 corresponds to the Boolean statement of A<1 or (B<2 and C<3). The first step is to initialize the To_Node and From_Node fields of the root element in the tree, "OR". The root nodes' To_Node and From Node are the beginning node add ending node of the graph (Node 1 and Node 2). Next, a preorder traversal is made of the tree.

Figures 21, 22:
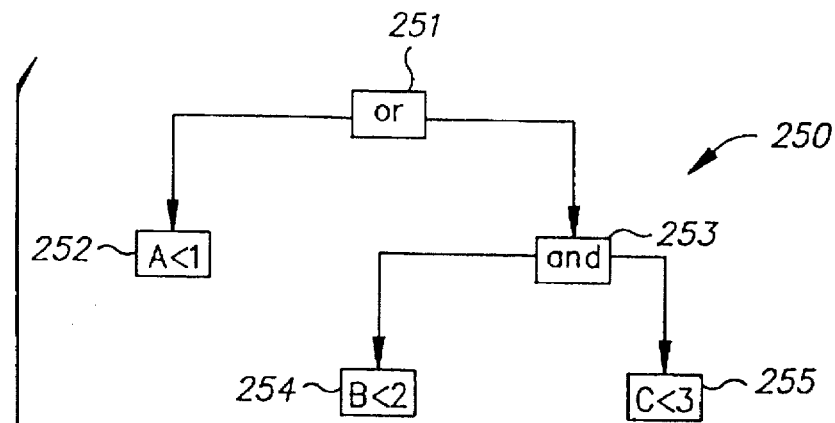
FIG. 21 is an initial parse tree.
FIG. 22 is the final arc list for the resulting directed graph from the initial parse tree of FIG. 21 using the algorithm of FIGS. 19 and 20.

A preorder traversal will visit the root element and then the other elements in numeric order as listed in FIG. 21. The first element is the root 251, the second element is root's the left child 252 (since the root's left child has no children), the third element is the root's right child 253, the fourth element is the left child of the root's right child 254, and the fifth element is its right child 255. So, the first element is the root "OR", the second element is A<1, the third is "AND", the fourth is B<2, the fifth is C<3.

The children of the first element 252 and 253, and the OR operator 251 have their To_Node and From_Node assigned the OR operator's To_Node and From Node values. So, the To_Nodes and From_Nodes of elements two and three, are each assigned Node 1 and Node 2, respectively.

The next element traversed is the second element 252 which is a predicate with no children. An arc is created with the elements From_Node and To_Node, Node 1 and Node 2, and the resulting arc is assigned the element's predicate, A<1 (260 in FIG. 22).

The next element, element three 253, is an AND operator. The From_Node of the left child 254 gets this element's From_Node (which is Node 1) and the To_Node of the right child 255 gets this element's To_Node (which is Node 2). A new node is created to be the left child's To_Node and the right child's From_Node. The new node is Node 3.

The next element, element four 254, is a predicate. An arc is created from this element From_Node to its To_Node (from Node 1 to Node 3) and the resulting arc is assigned the element's predicate, B<2 (262 in FIG. 22). The remaining element, element five 255, is also a predicate. An arc is created from the element's From_Node, Node 2, to its To_Node, Node 3 and the resulting arc is assigned the element's predicate, C<3 (264 in FIG. 22). The resulting graph is the arc list 266 in FIG. 22.

The graphical flow representation is displayed on the display device using a spacing algorithm. The input for the spacing algorithm is a list of node and predicate arc pairs (produced by the conversion of the Boolean statement to the directed graph). The list of pairs represents a graph of connecting nodes where each connection is described by the predicate text. The algorithm spaces the nodes and corresponding links so that the overlap of paths and the total area covered by the nodes is minimized. This can be illustrated with the following example where there are three nodes. Between nodes 1 and 2 there is a predicate called SALARY>2000 and another predicate called SALARY<500. Between nodes 2 and 3 there is a predicate called JOB=MGR and another predicate called JOB=COOK.

The algorithm produces from this list two subsequent lists; the first of these is called the node list and the second is the predicate list. The node list contains a list of node objects, each object having a position value. The predicate list contains a list of predicate objects each of which has the position value.

In general, the algorithm calculates the longest path through the node path, figures out the placement of the nodes on the longest path, the placement of the conditions on the longest path, the placement of remaining nodes on the remaining paths, and placement of remaining conditions on the remaining paths.

The longest path is calculated by every valid input list containing a description of a chain of nodes linked together via conditions forming in some cases a multitude of paths. Each path starts at the head node (normally 1) and ends at the tail node (normally n), where n is the count of nodes. The longest path is that path or paths originating at the head node and terminating at the tail node, which traverses through the most nodes.

Using the example and starting with those node pairs which have node 1 as their entry node value, there are two candidates; namely, node 1 to node 2 (SALARY>2000) and node 1 to node 2 (SALARY<500). The first of these nodes can be chosen and the exit node value of 2 is used to form a similar list from the overall predicate pair list giving node 2 to node 3 (JOB=MGR) and node 2 to node 3 (JOB=COOK). The two predicate pairs are supplied which have the value 2 as their entry node value. The first of these is used and the path is followed through to find an exit value equal to 3 which is the tail node. The end of the path is reached going through two predicates giving a path length of 2. This can be used to determine the longest path for a given set of data.

The next step is the placement of the nodes on the longest path. Given the list of nodes which represent the longest path for a given sample data set, positions are assigned to those nodes found on that longest path. Starting with an arbitrary position by default (100,100) where this number pair will be related to a point on the screen, a special constant is added to the first value for each node in the longest path. This special constant is the length of the longest predicate character string found in the sample data multiplied by the number of points a given character takes on the screen.

The next step is the placement of the predicates on the longest path. Predicates which have entry and exit nodes which have been assigned position values are now assigned a position themselves. For the simple case where only one predicate exits with a particular entry and exit node pair, the assignment is based on the midpoint between the two points assigned. When a pair of nodes are used by two or more predicates for their entry and exit node values, the assignment requires an extra step which involves adding a constant to the second value attached to the midpoint of a given entry/exit node pair. Further predicates are placed by adding the same constant to the prior value. The assignment procedure is repeated until all predicates situated on the longest path have been positioned.

The next step is the placement of the remaining nodes not on the longest path. The previous three steps have defined an envelope of space used by the longest path. Any remaining nodes not on the longest path are assigned position values based on the envelop of space. The procedure is straightforward. The entry node's first value is added to the special constant and the envelope's maximum height is used as a second value plus the high constant, giving a position which can be used for any remaining nodes. Each subsequent assignment of a position to a predicate expands the overall envelope of space attached to the sample data. To help minimize the occurrence of cross paths in the generated position of nodes and predicates, a flip component is used in the assignment of all nodes and predicates not found on the longest path. This flip component has the effect of placing each alternate node list on opposite sides of the longest path.

The final step is the placement of the remaining conditions on the remaining paths. This step makes use of the procedure of the previous step for placement of conditions on the longest path with the variation that the existing space envelope and flip component are taken into account for each placement as well as the nodes involved not being on the longest path.

While the preferred embodiment of the present invention has been illustrated in detail, it should be apparent that modifications and adaptations to that embodiment may occur to one skilled in the art without departing from the scope of the present invention as set forth in the following claims.

We claim:

1. A method for converting a graphical representation to a Boolean algebra statement representation comprising the steps of:

(a) when two arcs have the same To_Nodes and From_ Nodes, combining the arcs into one arc with the conditions represented by the original arc linked by a logical OR operand;

(b) when two arcs are in a series with a Third_Node in between having the same two arcs going into and out of it, combining the arcs into one arc with the conditions represented by each original arc linked by an AND operator;

(c) pushing onto a stack a graph path;

(d) popping a path from the stack for further processing;

(e) processing the path to produce a Boolean algebra statement segment while identifying any new paths;

(f) pushing a new path onto the stack; and (g) repeating steps (d) through (f) until the stack is empty.

2. A program storage device, readable by a computer, tangibly embodying a program of instructions executable by the computer to perform method steps for retrieving query data stored in tables having columns and rows, the computer being comprised of a central processing unit (CPU), a memory, a display device, and a user interaction device, the method comprising the steps of:

(a) receiving input identifying at least one table containing the query data;

(b) receiving input identifying at least one column of the identified table containing the query data;

(c) receiving input identifying at least one row in the identified table containing the query data using a condition statement interactively formulated by the following steps:

(1) displaying a graphical flow representation comprising at least one flowline comprising at least one arc, a predicate assigned to each arc, and a plurality of nodes, each arc positioned between a From_Node node and a To_Node node, wherein predicates on the same flowline are combined through a logical AND operation, and predicates on different flowlines between the same nodes are combined through a logical OR operation;

(2) receiving input specifying a position on a flowline of the graphical flow representation for insertion of a predicate;

(3) receiving input specifying the predicate;

(4) inserting the predicate at the specified position on the flowline;

(5) displaying the graphical flow representation with the predicate inserted in the specified position on the flowline;

(6) converting the graphical flow representation into a corresponding Boolean algebra statement; and (7) displaying the Boolean algebra statement.

3. The method of claim 2, further comprising the steps of:
receiving input from the user adding a predicate to a Boolean algebra statement;
converting the Boolean algebra statement to a corresponding graphical flow representation; and
displaying the graphical flow representation device.

4. The method of claim 2, comprising the further step of converting a graph that is a graphical flow representation to a Boolean algebra statement, the converting step comprising the steps of:
compressing the graph to a minimum number of nodes and arcs to produce a compressed graph; and
creating a corresponding Boolean algebra string by identifying at least one path through the compressed graph from a beginning node to an ending node.

5. The method of claim 4, wherein the step of compressing the graph further comprises the steps of:
combining each pair of arcs having the same To_Nodes and From_Nodes into a resulting arc with the predicates assigned to the pair of arcs connected by a logical OR operator assigned as a resulting predicate to the resulting arc; and
combining each pair of arcs having the same To_Node of a first arc and From_Node of a second arc into a resulting arc with the predicates assigned to the pair of arcs connected by an AND operator assigned as a resulting predicate to the resulting arc.

6. The method of claim 5, further comprising the steps of:
(i) pushing a graph path onto a stack;

(ii) popping a path from the stack for further processing;

(iii) processing the popped path to produce a Boolean algebra statement segment while identifying any new paths;

(iv) pushing a new path onto the stack; and (v) repeating steps (ii) through (iv) until the stack is empty.

7. The method of claim 3, further comprising the step of converting a Boolean algebra statement representation to a graphical flow representation, the converting step comprising the steps of:

arranging the Boolean algebra statement into a parse tree comprising a plurality of elements including a root, each element being a leaf or a non-leaf, each non-leaf having a left child and a right child, and each element having a value assigned for a From_Node and a To_Node, wherein each leaf is assigned a predicate and each non-leaf is assigned an OR operator or an AND operator; and processing each element of the tree in pre-order traversal assigning each predicate as an arc connecting a From_Node to a To_Node.

8. The method of claim 7, wherein the processing step comprises the steps of:

assigning the root From_Node and To_Node a beginning node and an ending node, respectively, of a resulting graph;

for each OR operator element, assigning the OR operator element From_Node and To_Node as the From_Node and To_Node, respectively, of the left child and right child of the OR operator element;

for each AND operator element, creating a new node, assigning the AND operator element From_Node as the From_Node of the left child of the AND operator element, assigning the new node as the To_Node of the left child and the From_Node of the right child of the AND operator element, and assigning the AND operator element To_Node as the To_Node of the right child of the AND operator element; and for each predicate element, creating an arc connecting the From_Node to the To_Node of the predicate element and assigning the predicate to the arc.

9. The method of claim 2, further comprising the step of interactively designating a section of the graphical flow representation as having a logical NOT operation applied to the section.

10. The method of claim 2, wherein the condition statement applies to groups of data.

11. The method of claim 2, further comprising the step of displaying a flow representation of a query as a series of icons in a directed graph, the icons corresponding to table and column selection, row condition formulation, and sorting, wherein the user selects icons to formulate part of a query.

12. The method of claim 2, further comprising the step of displaying a UNION query as a directed graph having a plurality of query graphs converging following the row condition formulation icon.

13. A program storage device, readable by a computer, tangibly embodying a program of instructions executable by the computer to perform method steps for converting a Boolean algebra statement representation to a graphical representation, the method comprising the steps of:

(a) arranging the Boolean statement into a parse tree, wherein each element in the parse tree has a tree From_Node and a tree To_Node, each element is a leaf or a non-leaf, each non-leaf has a left child and a right child, each leaf is a connector, and each non-leaf is an OR operator or an AND operator; and (b) processing each element of the tree in preorder traversal to assign each condition predicate as a graph arc defined as connecting a graph From Node to a graph To_Node, comprising the steps of:

(1) assigning the root element From_Node and To_Node as the Beginning_Node and Ending_Node of the graph;

(2) for an OR operator element, assigning an OR operator element From_Node and To_Node as the From_Node and To_Node of both of the OR operator element children;

(3) for an AND operator element, creating a New_Node, assigning the AND operator element From_Node as the From_Node of the left hand child of the AND operator element, the AND operator element To_Node as the To_Node of the right hand child of the AND connector element, assigning the New_Node as the To_Node of the left hand child and the from node of the right hand child of the AND operator element; and (4) for condition elements, creating an arc connecting the From_Node to the To_Node of the condition element by the condition.

14. In a computerized database system having a central processing unit (CPU), a memory, a display device, and a user interaction device, a method for retrieving query data stored in tables having columns and rows, comprising the steps of:

(a) receiving input identifying at least one table containing the query data;

(b) receiving input identifying at least one column of the identified table containing the query data;

(c) receiving input identifying at least one row in the identified table containing the query data using a condition statement interactively formulated by the following steps:

(1) displaying a graphical flow representation comprising at least one flowline comprising at least one arc, a predicate assigned to each arc, and a plurality of nodes, each arc positioned between a From_Node node and a To_Node node, wherein predicates on the same flowline are combined through a logical AND operation, and predicates on different flowlines between the same nodes are combined through a logical OR operation;

(2) receiving input specifying a position on a flowline of the graphical flow representation for insertion of a predicate;

(3) receiving input specifying the predicate;

(4) inserting the predicate at the specified position on the flowline;

(5) displaying the graphical flow representation with the predicate inserted in the specified position on the flowline;

(6) converting the graphical flow representation into a corresponding Boolean algebra statement; and (7) displaying the Boolean algebra statement.

15. The method of claim 14, further comprising the steps of:

receiving input from the user adding a predicate to a Boolean algebra statements converting the Boolean algebra statement to a corresponding graphical flow representation; and displaying the graphical flow representation device.

16. The method of claim 14, comprising the further step of converting a graph that is a graphical flow representation to a Boolean algebra statement, the converting step comprising the steps of:

compressing the graph to a minimum number of nodes and arcs to produce a compressed graph; and creating a corresponding Boolean algebra string by identifying at least one path through the compressed graph from a beginning node to an ending node.

17. The method of claim 16, wherein the step of compressing the graph further comprises the steps of:
combining each pair of arcs having the same To_Nodes and From_Nodes into a resulting arc with the predicates assigned to the pair of arcs connected by a logical OR operator assigned as a resulting predicate to the resulting arc; and combining each pair of arcs having the same To_Node of a first arc and From_Node of a second arc into a resulting arc with the predicates assigned to the pair of arcs connected by an AND operator assigned as a resulting predicate to the resulting arc.

18. The method of claim 17, further comprising the steps of:

(i) pushing a graph path onto a stack;

(ii) popping a path from the stack for further processing;

(iii) processing the popped path to produce a Boolean algebra statement segment while identifying any new paths;

(iv) pushing a new path onto the stack; and (v) repeating steps (ii) through (iv) until the stack is empty.

19. The method of claim 15, further comprising the step of converting a Boolean algebra statement representation to a graphical flow representation, the converting step comprising the steps of:

arranging the Boolean algebra statement into a parse tree comprising a plurality of elements including a root, each element being a leaf or a non-leaf, each non-leaf having a left child and a right child, and each element having a value assigned for a From_Node and a To_Node, wherein each leaf is assigned a predicate and each non-leaf is assigned an OR operator or an AND operator; and processing each element of the tree in pre-order traversal assigning each predicate as an arc connecting a From_Node to a To_Node.

20. The method of claim 19, wherein the processing step comprises the steps of:

assigning the root From_Node and To_Node a beginning node and an ending node, respectively, of a resulting graph;

for each OR operator element, assigning the OR operator element From_Node and To_Node as the From_Node and To_Node, respectively, of the left child and right child of the OR operator element;

for each AND operator element, creating a new node, assigning the AND operator element From_Node as the From_Node of the left child of the AND operator element, assigning the new node as the To_Node of the left child and the From_Node of the right child of the AND operator element, and assigning the AND operator element To_Node as the To_Node of the right child of the AND operator element; and for each predicate element, creating an arc connecting the From_Node to the To_Node of the predicate element and assigning the predicate to the arc.

21. The method of claim 14, further comprising the step of interactively designating a section of the graphical flow representation as having a logical NOT operation applied to the section.

22. The method of claim 14, wherein the condition statement applies to groups of data.

23. The method of claim 14, further comprising the step of displaying a flow representation of a query as a series of icons in a directed graph, the icons corresponding to table and column selection, row condition formulation, and sorting, wherein the user selects icons to formulate part of a query.

24. The method of claim 14, further comprising the step of displaying a UNION query as a directed graph having a plurality of query graphs converging following the row condition formulation icon.

25. A method for converting a Boolean algebra statement representation to a graphical representation, comprising the steps of:
    (a) arranging the Boolean statement into a parse tree, wherein each element in the parse tree has a tree From_Node and a tree To_Node, each element is a leaf or a non-leaf, each non-leaf has a left child and a right child, each leaf is a connector, and each non-leaf is an OR operator or an AND operator; and
    (b) processing each element of the tree in preorder traversal to assign each condition predicate as a graph arc defined as connecting a graph From_Node to a graph To_Node, comprising the steps of:
        (1) assigning the root element From_Node and To_Node as the Beginning_Node and Ending_Node of the graph;
        (2) for an OR operator element, assigning an OR operator element From_Node and To_Node as the From_Node and To_Node of both of the OR operator element children;
        (3) for an AND operator element, creating a New_Node, assigning the AND operator element From_Node as the From_Node of the left hand child of the AND operator element, the AND operator element To_Node as the To_Node of the right hand child of the AND connector element, assigning the New_Node as the To_Node of the left hand child and the From_Node of the right hand child of the AND operator element; and
        (4) for condition elements, creating an arc connecting the From_Node to the To_Node of the condition element by the condition.

26. A computerized database system, comprising:
    (a) a computer system comprised of a central processing unit (CPU), a memory, a display device, and a user interaction device,
    (b) means, performed by the computer system, for retrieving query data stored in tables having columns and rows, the means for retrieving comprising:
        (1) means for receiving input identifying at least one table containing the query data;
        (2) means for receiving input identifying at least one column of the identified table containing the query data;
        (3) means for receiving input identifying at least one row in the identified table containing the query data a using a condition statement interactively formulated by the following elements:
    means for displaying a graphical flow representation comprising at least one flowline comprising at least one arc, a predicate assigned to each arc, and a plurality of nodes, each arc positioned between a From_Node node and a To_Node node, wherein predicates on the same flowline are combined through a logical AND operation, and predicates on different flowlines between the same nodes are combined through a logical OR operation;
    means for receiving input specifying a position on a flowline of the graphical flow representation for insertion of a predicate;
    means for receiving input specifying the predicate;
    means for inserting the predicate at the specified position on the flowline;
    means for displaying the graphical flow representation with the predicate inserted in the specified position on the flowline;
    means for converting the graphical flow representation into a corresponding Boolean algebra statement; and
    means for displaying the Boolean algebra statement.

27. The apparatus of claim 26, further comprising:
    means for receiving input from the user adding a predicate to a Boolean algebra statement;
    means for converting the Boolean algebra statement to a corresponding graphical flow representation; and
    means for displaying the graphical flow representation device.

28. The apparatus of claim 26, further comprising means for converting a graph that is a graphical flow representation to a Boolean algebra statement, the means for converting comprising:
    means for compressing the graph to a minimum number of nodes and arcs to produce a compressed graph; and
    means for creating a corresponding Boolean algebra string by identifying at least one path through the compressed graph from a beginning node to an ending node.

29. The apparatus of claim 28, wherein the means for compressing the graph further comprises:
    means for combining each pair of arcs having the same To_Nodes and From_Nodes into a resulting arc with the predicates assigned to the pair of arcs connected by a logical OR operator assigned as a resulting predicate to the resulting arc; and
    means for combining each pair of arcs having the same To_Node of a first arc and From_Node of a second arc into a resulting arc with the predicates assigned to the pair of arcs connected by an AND operator assigned as a resulting predicate to the resulting arc.

30. The apparatus of claim 29, further comprising:
    (i) means for pushing a graph path onto a stack;
    (ii) means for popping a path from the stack for further processing;
    (iii) means for processing the popped path to produce a Boolean algebra statement segment while identifying any new paths;
    (iv) means for pushing a new path onto the stack; and
    (v) means for repeating the means (ii) through (iv) until the stack is empty.

31. The apparatus of claim 27, further comprising means for converting a Boolean algebra statement representation to a graphical flow representation, the means for converting comprising:

means for arranging the Boolean algebra statement into a parse tree comprising a plurality of elements including a root, each element being a leaf or a non-leaf, each non-leaf having a left child and a right child, and each element having a value assigned for a From_Node and a To_Node, wherein each leaf is assigned a predicate and each non-leaf is assigned an OR operator or an AND operator; and means for processing each element of the tree in pre-order traversal assigning each predicate as an arc connecting a From_Node to a To_Node.

32. The apparatus of claim 31, wherein the means for processing comprises:

means for assigning the root From_Node and To_Node a beginning node and an ending node, respectively, of a resulting graph;

for each OR operator element, means for assigning the OR operator element From_Node and To_Node as the From_Node and To_Node, respectively, of the left child and right child of the OR operator element;

for each AND operator element, means for creating a new node, means for assigning the AND operator element From_Node as the From_Node of the left child of the AND operator element, assigning the new node as the To_Node of the left child and the From_Node of the right child of the AND operator element, and means for assigning the AND operator element To_Node as the To_Node of the right child of the AND operator element; and for each predicate element, means for creating an connecting the From_Node to the To_Node of the predicate element and means for assigning the predicate to the arc.

33. The apparatus of claim 26, further comprising means for interactively designating a section of the graphical flow representation as having a logical NOT operation applied to the section.

34. The apparatus of claim 26, wherein the condition statement applies to groups of data.

35. The apparatus of claim 26, further comprising means for displaying a flow representation of a query as a series of icons in a directed graph, the icons corresponding to table and column selection, row condition formulation, and sorting, wherein the user selects icons to formulate part of a query.

36. The apparatus of claim 26, further comprising means for displaying a UNION query as a directed graph having a plurality of query graphs converging following the row condition formulation icon.

37. A computer-implemented apparatus for converting a Boolean algebra statement representation to a graphical representation, comprising:

(a) means for arranging the Boolean statement into a parse tree, wherein each element in the parse tree has a tree From_Node and a tree To_Node, each element is a leaf or a non-leaf, each non-leaf has a left child and a right child, each leaf is a connector, and each non-leaf is an OR operator or an AND operator; and (b) means for processing each element of the tree in preorder traversal to assign each condition predicate as a graph arc defined as connecting a graph From_Node to a graph To_Node, comprising:

(1) means for assigning the root element From_Node and To_Node as the Beginning_Node and Ending_Node of the graph;

(2) for an OR operator element, means for assigning an OR operator element From_Node and To_Node as the From_Node and To_Node of both of the OR operator element children;

(3) for an AND operator element, means for creating a New_Node, means for assigning the AND operator element From_Node as the From_Node of the left hand child of the AND operator element, the AND operator element To_Node as the To_Node of the right hand child of the AND connector element, means for assigning the New_Node as the To_Node of the left hand child and the From_Node of the right hand child of the AND operator element; and (4) for condition elements, means for creating an arc connecting the From_Node to the To_Node of the condition element by the condition.

* * * * *

UNITED STATES PATENT AND TRADEMARK OFFICE
CERTIFICATE OF CORRECTION

PATENT NO. : 5,701,456

DATED : December 23, 1997

INVENTOR(S) : Tom W. Jacopi, et al.

It is certified that error appears in the above-identified patent and that said Letters Patent is hereby corrected as shown below:

Column 1, line 56, strike "1" before 'SELECT".

Column 1, line 57, strike "2" before "FROM".

Column 1, line 58, strike "1" before "WHERE".

Column 5, line 31, "vet" should read --set--.

Column 8, line 36, "stacts" should read --stacks--.

Column 19, line 67, "statements" should read --statement;--.

Column 21, line 49, "Prom_Node" should read --From_Node--.

Column 22, line 1, strike "a" (first occurrence).

Signed and Sealed this

Twenty-third Day of June, 1998

*Attest:*

BRUCE LEHMAN

*Attesting Officer*       *Commissioner of Patents and Trademarks*